United States Patent
Yerramalli et al.

(10) Patent No.: US 11,848,882 B2
(45) Date of Patent: Dec. 19, 2023

(54) SIGNALING TIMING OFFSET BETWEEN STATIONS FOR USER EQUIPMENT BASED POSITIONING

(71) Applicant: QUALCOMM Incorporated, San Diego, CA (US)

(72) Inventors: Srinivas Yerramalli, Hyderabad (IN); Taesang Yoo, San Diego, CA (US); Jing Sun, San Diego, CA (US); Xiaoxia Zhang, San Diego, CA (US); Alexandros Manolakos, Escondido, CA (US); Lorenzo Ferrari, Oakland, CA (US); Yih-Hao Lin, San Diego, CA (US); Rajat Prakash, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 244 days.

(21) Appl. No.: 17/363,803

(22) Filed: Jun. 30, 2021

(65) Prior Publication Data

US 2022/0014327 A1    Jan. 13, 2022

Related U.S. Application Data

(60) Provisional application No. 63/047,130, filed on Jul. 1, 2020.

(51) Int. Cl.
*H04L 5/00* (2006.01)

(52) U.S. Cl.
CPC .................. *H04L 5/0048* (2013.01)

(58) Field of Classification Search
CPC . H04L 5/0048; G01S 5/06; G01S 5/10; G01S 5/02216; G01S 5/021
See application file for complete search history.

(56) References Cited

U.S. PATENT DOCUMENTS

| | | | |
|---|---|---|---|
| 2010/0195566 A1* | 8/2010 | Krishnamurthy | H04L 5/0007 370/328 |
| 2012/0063492 A1* | 3/2012 | Palanki | H04W 56/001 375/211 |

(Continued)

FOREIGN PATENT DOCUMENTS

| | | |
|---|---|---|
| WO | 2016098635 A1 | 6/2016 |
| WO | 2020068310 A1 | 4/2020 |

OTHER PUBLICATIONS

"Technology and Standardization Gaps for High Accuracy Positioning in 5g"; Chaloupka; IEEE Communications Standards Magazine • Mar. 2017 (Year: 2017).*

(Continued)

*Primary Examiner* — Benjamin H Elliott, IV

(74) *Attorney, Agent, or Firm* — QUALCOMM Incorporated

(57) ABSTRACT

Techniques are provide for calibrating device timelines for use in passive positioning of user equipment (UE). An example method for passive positioning of a user equipment includes receiving a first positioning reference signal from a first device at a first time, receiving a second positioning reference signal from a second device at a second time, receiving a timeline difference value associated with the first device and the second device, and determining a time difference of arrival between the first positioning reference signal and the second positioning reference signal based at least in part on the timeline difference value.

56 Claims, 15 Drawing Sheets

(56) References Cited

U.S. PATENT DOCUMENTS

| | | | | |
|---|---|---|---|---|
| 2014/0295881 A1* | 10/2014 | Werner | ............... | G01S 5/0236 455/456.1 |
| 2014/0349582 A1* | 11/2014 | Xiao | ............... | G01S 5/10 455/67.11 |
| 2015/0219750 A1* | 8/2015 | Xiao | ............... | G01S 5/14 342/451 |
| 2016/0095080 A1* | 3/2016 | Khoryaev | ............ | G01S 5/0284 455/456.1 |
| 2016/0187455 A1* | 6/2016 | Shah | ............... | G01S 5/02 370/350 |
| 2016/0205651 A1* | 7/2016 | Isa | ............... | H04W 28/0247 455/456.1 |
| 2018/0160389 A1* | 6/2018 | Yerramalli | ............ | H04W 24/10 |
| 2018/0217228 A1* | 8/2018 | Edge | ............... | H04W 64/00 |
| 2018/0220392 A1* | 8/2018 | Ly | ............... | H04W 64/00 |
| 2018/0310127 A1* | 10/2018 | Xia | ............... | H04W 24/10 |
| 2019/0101615 A1* | 4/2019 | Tenny | ............... | G01S 5/0045 |
| 2019/0182629 A1* | 6/2019 | Priyanto | ............... | G01S 1/045 |
| 2019/0208366 A1* | 7/2019 | Sosnin | ............... | G01S 13/876 |
| 2021/0329417 A1* | 10/2021 | Priyanto | ............... | G01S 1/20 |
| 2021/0352613 A1* | 11/2021 | Yoon | ............... | H04W 52/245 |
| 2022/0011396 A1* | 1/2022 | Keating | ............... | G01S 5/0284 |
| 2022/0014327 A1* | 1/2022 | Yerramalli | ............... | G01S 5/10 |
| 2022/0026517 A1* | 1/2022 | Hasegawa | ............... | G01S 1/08 |
| 2022/0279581 A1* | 9/2022 | Baek | ............... | G01S 13/765 |
| 2023/0079891 A1* | 3/2023 | Shreevastav | ............ | G01S 5/10 342/458 |

OTHER PUBLICATIONS

Partial International Search Report—PCT/US2021/039882—ISA/EPO—dated Oct. 22, 2021.

International Search Report and Written Opinion—PCT/US2021/039882—ISA/EPO—dated Jan. 28, 2022.

\* cited by examiner

SIGNALING TIMING OFFSET BETWEEN STATIONS FOR USER EQUIPMENT BASED POSITIONING

CROSS-REFERENCE TO RELATED APPLICATION

This application claims the benefit of U.S. Provisional Application No. 63/047,130, filed Jul. 1, 2020, entitled "SIGNALING TIMING OFFSET BETWEEN STATIONS FOR USER EQUIPMENT BASED POSITIONING," which is assigned to the assignee hereof, and the entire contents of which are hereby incorporated herein by reference for all purposes.

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax), and a fifth generation (5G) service (e.g., 5G New Radio (NR)). There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, etc.

It is often desirable to know the location of a user equipment (UE), e.g., a cellular phone, with the terms "location" and "position" being synonymous and used interchangeably herein. A location services (LCS) client may desire to know the location of the UE and may communicate with a location center in order to request the location of the UE. The location center and the UE may exchange messages, as appropriate, to obtain a location estimate for the UE. The location center may return the location estimate to the LCS client, e.g., for use in one or more applications.

Obtaining the location of a mobile device that is accessing a wireless network may be useful for many applications including, for example, emergency calls, personal navigation, asset tracking, locating a friend or family member, etc. Existing positioning methods include methods based on measuring radio signals transmitted from a variety of devices including satellite vehicles and terrestrial radio sources in a wireless network such as base stations and access points.

SUMMARY

An example method for providing a timeline difference value to a user equipment according to the disclosure includes transmitting a first positioning reference signal to a device, determining an arrival time for the first positioning reference signal based on a first timeline, receiving a second positioning reference signal from the device, determining an arrival time for the second positioning reference signal based on a second timeline, determining the timeline difference value based at least in part on the arrival times of the first positioning reference signal and the second positioning reference signal, and providing the timeline difference value to the user equipment.

Implementations of such a method may include one or more of the following features. The first positioning reference signal may be transmitted with a first panel, the second positioning reference signal may be received with the first panel, and the timeline difference value may be associated with the first panel. The first positioning reference signal and the second positioning reference signal may not be received via a line of sight transmission path. Providing the timeline difference value to the user equipment may include providing the timeline difference value to a network server. Providing the timeline difference value to the user equipment may include providing the timeline difference value via network signaling. Determining the timeline difference value may include receiving the timeline difference value from a network server. Providing the timeline difference value to the user equipment may include providing identification information associated with two devices. Providing the timeline difference value to the user equipment may include providing identification information associated with the first positioning reference signal and the second positioning reference signal. The device may be a second user equipment and the second positioning reference signal may be received via a sidelink transmitted from the second user equipment. The method may include providing assistance data to the user equipment. The first positioning reference signal and the second positioning reference signal may be from different frequency layers.

An example method for passive positioning of a user equipment according to the disclosure includes receiving a first positioning reference signal from a first device at a first time, receiving a second positioning reference signal from a second device at a second time, receiving a timeline difference value associated with the first device and the second device, and determining a time difference of arrival between the first positioning reference signal and the second positioning reference signal based at least in part on the timeline difference value.

Implementations of such a method may include one or more of the following features. The timeline difference value may be received from a serving device. The first positioning reference signal may be an on-demand positioning reference signal. A passive positioning start message may be received prior to receiving the first positioning reference signal. The method may include providing the time difference of arrival to a network server. The first positioning reference signal may be associated with a first panel in the first device and the timeline difference value may be associated with the first panel. The second device may be a second user equipment and the second positioning reference signal may be received via a sidelink transmitted from the second user equipment. The method may further include receiving a third positioning reference signal from a third device, receiving a second timeline difference value associated with the second device and the third device, and determining a second time difference of arrival between the second positioning reference signal and the third positioning reference signal based at least in part on the second timeline difference value. The method may also include receiving a third timeline difference value associated with the first device and the third device, and determining a third time difference of arrival between the first positioning reference signal and the third positioning reference signal based at least in part on the third timeline difference value. The method may include determining a third timeline difference value associated with the first device and the third device based at least in part on the timeline difference value and the second timeline difference value, and determining a third time difference of arrival between the first positioning reference signal and the third positioning reference signal based at least in part on the third timeline difference value. Calculating a position estimate may be based at least in part on the time difference of arrival.

An example method for determining a timeline difference value according to the disclosure includes receiving a first waveform associated with a first positioning reference signal transmitted from a first device to a second device, receiving a second waveform associated with a second positioning reference signal transmitted from the second device to the first device, wherein the second positioning reference signal is transmitted in response to receiving the first positioning reference signal, determining the timeline difference value associated with the first device and the second device based at least on part on the first waveform and the second waveform, and providing the timeline difference value to a user equipment, wherein the user equipment is configured to determine a time difference of arrival for signals transmitted from the first device and the second device.

Implementations of such a method may include one or more of the following features. The first waveform may be a first channel frequency response of the first positioning reference signal and the second waveform may be a second channel frequency response of the second positioning reference signal. The timeline difference value may be estimated via a maximum likelihood estimation in a frequency domain based on a delay required to compensate a phase rotation between the first channel frequency response and the second channel frequency response. Providing the timeline difference value to the user equipment may include providing the timeline difference value to a serving device. Providing the timeline difference value to the user equipment may include providing the timeline difference value to the first device or the second device.

An example apparatus for providing a timeline difference value to a user equipment according to the disclosure includes a memory, at least one transceiver, at least one processor communicatively coupled to the memory and the at least one transceiver, and configured to transmit a first positioning reference signal to a device, determine an arrival time for the first positioning reference signal based on a first timeline, receive a second positioning reference signal from the device, determine an arrival time for the second positioning reference signal based on a second timeline, determine the timeline difference value based at least in part on the arrival times of the first positioning reference signal and the second positioning reference signal, and provide the timeline difference value to the user equipment.

An example apparatus according to the disclosure includes a memory, at least one transceiver, at least one processor communicatively coupled to the memory and the at least one transceiver and configured to receive a first positioning reference signal from a first device at a first time, receive a second positioning reference signal from a second device at a second time, receive a timeline difference value associated with the first device and the second device, and determine a time difference of arrival between the first positioning reference signal and the second positioning reference signal based at least in part on the timeline difference value.

An example apparatus according to the disclosure includes a memory, at least one transceiver, at least one processor communicatively coupled to the memory and the at least one transceiver and configured to receive a first waveform associated with a first positioning reference signal transmitted from a first device to a second device, receive a second waveform associated with a second positioning reference signal transmitted from the second device to the first device, wherein the second positioning reference signal is transmitted in response to receiving the first positioning reference signal, determine a timeline difference value associated with the first device and the second device based at least on part on the first waveform and the second waveform, and provide the timeline difference value to a user equipment, wherein the user equipment is configured to determine a time difference of arrival for signals transmitted from the first device and the second device.

An example apparatus according to the disclosure includes means for transmitting a first positioning reference signal to a device, means for determining an arrival time for the first positioning reference signal based on a first timeline, means for receiving a second positioning reference signal from the device, means for determining an arrival time for the second positioning reference signal based on a second timeline, means for determining a timeline difference value based at least in part on the arrival times of the first positioning reference signal and the second positioning reference signal, and means for providing the timeline difference value to a user equipment.

An example apparatus according to the disclosure includes means for receiving a first positioning reference signal from a first device at a first time, means for receiving a second positioning reference signal from a second device at a second time, means for receiving a timeline difference value associated with the first device and the second device, and means for determining a time difference of arrival between the first positioning reference signal and the second positioning reference signal based at least in part on the timeline difference value.

An example apparatus according to the disclosure includes means for receiving a first waveform associated with a first positioning reference signal transmitted from a first device to a second device, means for receiving a second waveform associated with a second positioning reference signal transmitted from the second device to the first device, wherein the second positioning reference signal is transmitted in response to receiving the first positioning reference signal, means for determining a timeline difference value associated with the first device and the second device based at least on part on the first waveform and the second waveform, and means for providing the timeline difference value to a user equipment, wherein the user equipment is configured to determine a time difference of arrival for signals transmitted from the first device and the second device.

An example non-transitory processor-readable storage medium comprising processor-readable instructions configured to cause one or more processors to provide a timeline difference value to a user equipment according to the disclosure includes code for transmitting a first positioning reference signal to a device, code for determining an arrival time for the first positioning reference signal based on a first timeline, code for receiving a second positioning reference signal from the device, code for determining an arrival time for the second positioning reference signal based on a second timeline, code for determining the timeline difference value based at least in part on the arrival times of the first positioning reference signal and the second positioning reference signal, and code for providing the timeline difference value to the user equipment.

An example non-transitory processor-readable storage medium comprising processor-readable instructions configured to cause one or more processors to position a user equipment according to the disclosure includes code for receiving a first positioning reference signal from a first device at a first time, code for receiving a second positioning reference signal from a second device at a second time, code for receiving a timeline difference value associated with the first device and the second device, and code for determining a time difference of arrival between the first positioning reference signal and the second positioning reference signal based at least in part on the timeline difference value.

An example non-transitory processor-readable storage medium comprising processor-readable instructions configured to cause one or more processors to determine a timeline difference value according to the disclosure includes code for receiving a first waveform associated with a first positioning reference signal transmitted from a first device to a second device, code for receiving a second waveform associated with a second positioning reference signal transmitted from the second device to the first device, wherein the second positioning reference signal is transmitted in response to receiving the first positioning reference signal, code for determining the timeline difference value associated with the first device and the second device based at least on part on the first waveform and the second waveform, and code for providing the timeline difference value to a user equipment, wherein the user equipment is configured to determine a time difference of arrival for signals transmitted from the first device and the second device.

Items and/or techniques described herein may provide one or more of the following capabilities, as well as other capabilities not mentioned. A first device may transmit a first positioning reference signal based on a first timeline. The first device may measure the arrival time of the first positioning reference signal based on the first timeline. A second device may transmit a second positioning reference signal based on a second time line. The second device may measure the arrival time of the second positioning reference signal based on the second timeline. The measured arrival times may be used to determine a timeline difference value associated with the first and second devices. The timeline difference value may be provided to user equipment. The observed time difference of arrival for positioning reference signals transmitted from the first and second devices may be modified based on the timeline difference value. The accuracy of passive positioning may be increased. Timeline difference values may be inferred for devices which cannot exchange reference signals directly. Other capabilities may be provided and not every implementation according to the disclosure must provide any, let alone all, of the capabilities discussed.

DETAILED DESCRIPTION

Techniques are discussed herein for passive positioning of user equipment (UE) with two or more stations. 5G NR includes several positioning methods such as downlink (DL) and uplink (UL) Time Difference of Arrival (TDOA), DL Angle of Departure (AoD), UL Angle of Arrival (AoA), DL initiated Round Trip Time (RTT), and combinations of these methods. In general, some TDOA methods may require network synchronization. In contrast, RTT based methods are not dependent on network synchronization. Simultaneously positioning user equipment in high density areas (e.g., stadiums, convention centers, Internet of Things (IoT) installations, and Industrial IoT (IIoT), etc.) may present challenges associated with messaging and bandwidth limitations. For example, RTT methods require transmissions from each UE and thus may not be scalable in UE dense environments. DL TDOA based methods, however, with time synchronized NR networks may be scaled to a large number of devices without exceeding bandwidth limitations. For example, fixed overhead positioning reference signal (PRS) transmissions from base stations may be used. The PRS transmissions are independent from the number of UEs and the UEs are not required to transmit responses to the PRS transmissions.

In general, each station in a 5G NR network may attempt to maintain a consistent timeline with other stations in the network. The timeline may be based, for example, on the timing associated with satellite navigation systems such as the Global Positioning System (GPS). Various hardware, software, or other factors may cause variations in the time keeping abilities of the stations in a network. In the absence of a periodic synchronization signal, the variations in timelines for each station may reduce the accuracy of OTDOA positioning methods. For example, if two stations do not have a consistent line of sight (LOS) communication path between them, inconsistencies within the internal timelines of the stations may cause errors in the distance calculations performed by a user equipment (UE). The techniques provided herein provide for a calibration of transmission times between two stations and integrate the process in the UE positioning. For example, a timeline difference value may be determined based on positioning reference signals transmitted between two stations. The resulting timeline difference value may be provided to UEs and included in an observed time difference of arrival computations and the corresponding positioning calculations. Network resources, such as a location server, may be used to determine the timeline difference value associated with two stations. The timeline difference values for stations maybe broadcast or signaled to UEs in the coverage area of the network. These techniques and configurations are examples, and other techniques and configurations may be used.

Figure 1:
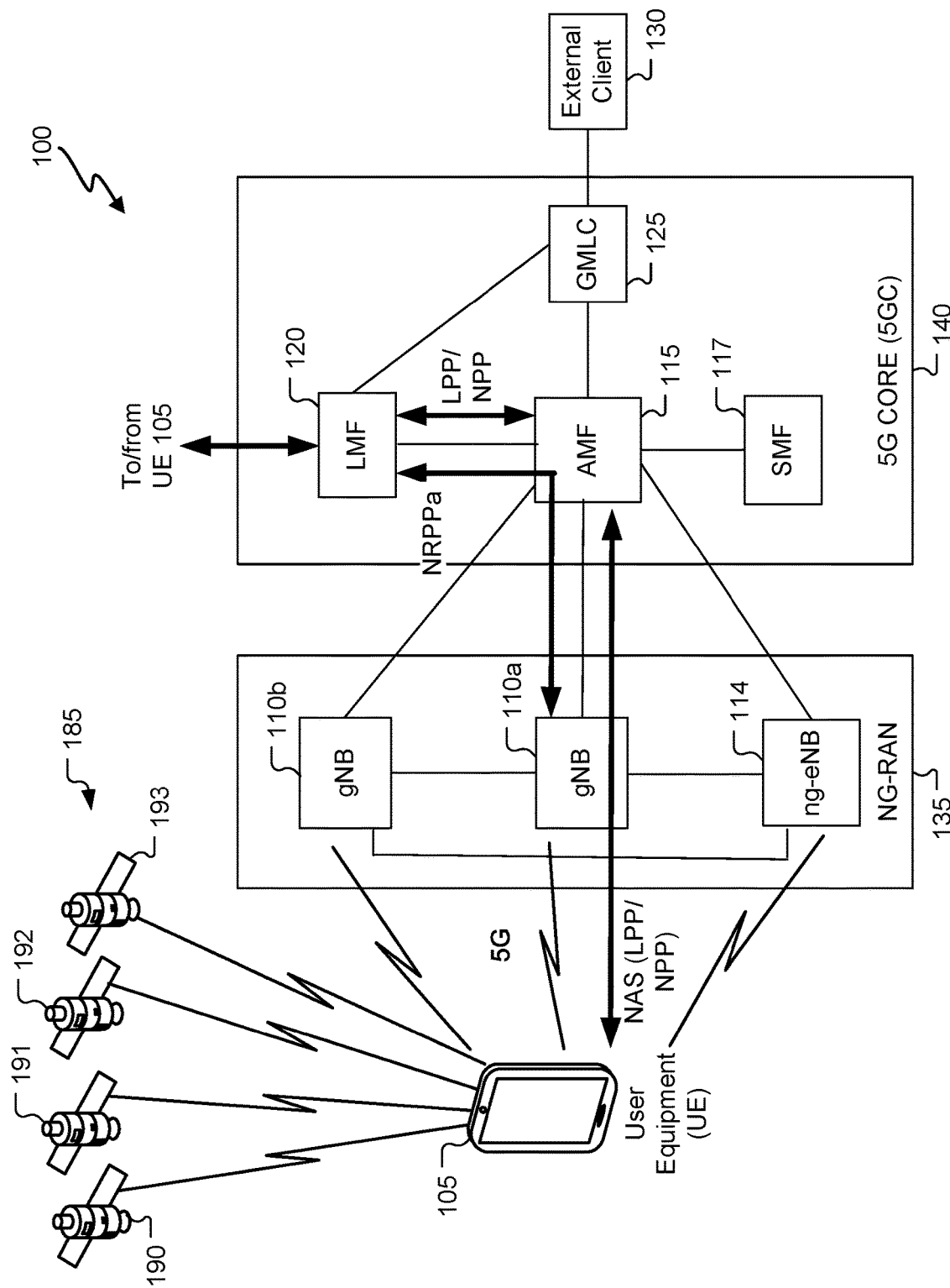
FIG. 1 is a simplified diagram of an example wireless communications system.

Referring to FIG. 1, an example of a communication system 100 includes a UE 105, a Radio Access Network (RAN) 135, here a Fifth Generation (5G) Next Generation (NG) RAN (NG-RAN), and a 5G Core Network (5GC) 140. The UE 105 may be, e.g., an IoT device, a location tracker device, a cellular telephone, or other device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3$^{rd}$ Generation Partnership Project (3GPP). Accordingly, the NG-RAN 135 and the 5GC 140 may conform to current or future standards for 5G support from 3GPP. The RAN 135 may be another type of RAN, e.g., a 3G RAN, a 4G Long Term Evolution (LTE) RAN, etc. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110a, 110b, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110a, 110b and the ng-eNB 114 are communicatively coupled to each other, are each configured to bi-directionally wirelessly communicate with the UE 105, and are each communicatively coupled to, and configured to bi-directionally communicate with, the AMF 115. The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions.

FIG. 1 provides a generalized illustration of various components, any or all of which may be utilized as appropriate, and each of which may be duplicated or omitted as necessary. Specifically, although one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110a, 110b, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110a, 110b, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110a, 110b are examples and may, in various embodiments, be replaced by or include various other location server functionality and/or base station functionality respectively.

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, tracking device, navigation device, Internet of Things (IoT) device, asset tracker, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110a, 110b, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110a and 110b. Pairs of the gNBs 110a, 110b in the NG-RAN 135 may be connected to one another via one or more other gNBs. Access to the 5G network is provided to the UE 105 via wireless communication between the UE 105 and one or more of the gNBs 110a, 110b, which may provide wireless communications access to the 5GC 140 on behalf of the UE 105 using 5G. In FIG. 1, the serving gNB for the UE 105 is assumed to be the gNB 110a, although another gNB (e.g. the gNB 110b) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110a, 110b in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110a, 110b and/or the ng-eNB 114 may be configured to function as positioning-only beacons which may transmit signals to assist with determining the position of the UE 105 but may not receive signals from the UE 105 or from other UEs.

The BSs 110a, 110b, 114 may each comprise one or more TRPs. For example, each sector within a cell of a BS may comprise a TRP, although multiple TRPs may share one or more components (e.g., share a processor but have separate antennas). The system 100 may include macro TRPs or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110a, 110b and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications. The LMF 120 may support positioning of the UE 105 when the UE 105 accesses the NG-RAN 135 and may support position procedures/methods such as Assisted GNSS (A-GNSS), Observed Time Difference of Arrival (OTDOA), Real Time Kinematics (RTK), Precise Point Positioning (PPP), Differential GNSS (DGNSS), Enhanced Cell ID (E-CID), angle of arrival (AOA), angle of departure (AOD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110a, 110b and/or the ng-eNB 114, and/or assistance data provided to the UE 105, e.g. by the LMF 120).

The GMLC 125 may support a location request for the UE 105 received from the external client 130 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130. The GMLC 125 is shown connected to both the AMF 115 and LMF 120, though one of these connections may be supported by the 5GC 140 in some implementations.

As further illustrated in FIG. 1, the LMF 120 may communicate with the gNBs 110a, 110b and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110a (or the gNB 110b) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110a, 110b or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110a, 110b or the ng-eNB 114) and/or may be used by the LMF 120 to obtain location related information from the gNBs 110a, 110b and/or the ng-eNB 114, such as parameters defining directional SS transmissions from the gNBs 110a, 110b, and/or the ng-eNB 114.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110a, 110b, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110a, 110b, the ng-eNB 114, or other base stations or APs).

With a network-based position method, one or more base stations (e.g., the gNBs 110a, 110b, and/or the ng-eNB 114) or APs may obtain location measurements (e.g., measurements of RSSI, RTT, RSRP, RSRQ or Time Of Arrival (TOA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110a, 110b, and/or the ng-eNB 114 to the LMF 120 using NRPPa may include timing and configuration information for directional PRS or SS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110a, 110b, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110a (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 150. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110a, 110b, the ng-eNB 114, the AMF 115, and the LMF 120 may, in some cases, apply instead to other network elements such eNBs, WiFi APs, an MME, and an E-SMLC.

As noted, in some embodiments, positioning functionality may be implemented, at least in part, using the directional SS beams, sent by base stations (such as the gNBs 110a, 110b, and/or the ng-eNB 114) that are within range of the UE whose position is to be determined (e.g., the UE 105 of FIG. 1). The UE may, in some instances, use the directional SS beams from a plurality of base stations (such as the gNBs 110a, 110b, the ng-eNB 114, etc.) to compute the UE's position.

Figure 2:
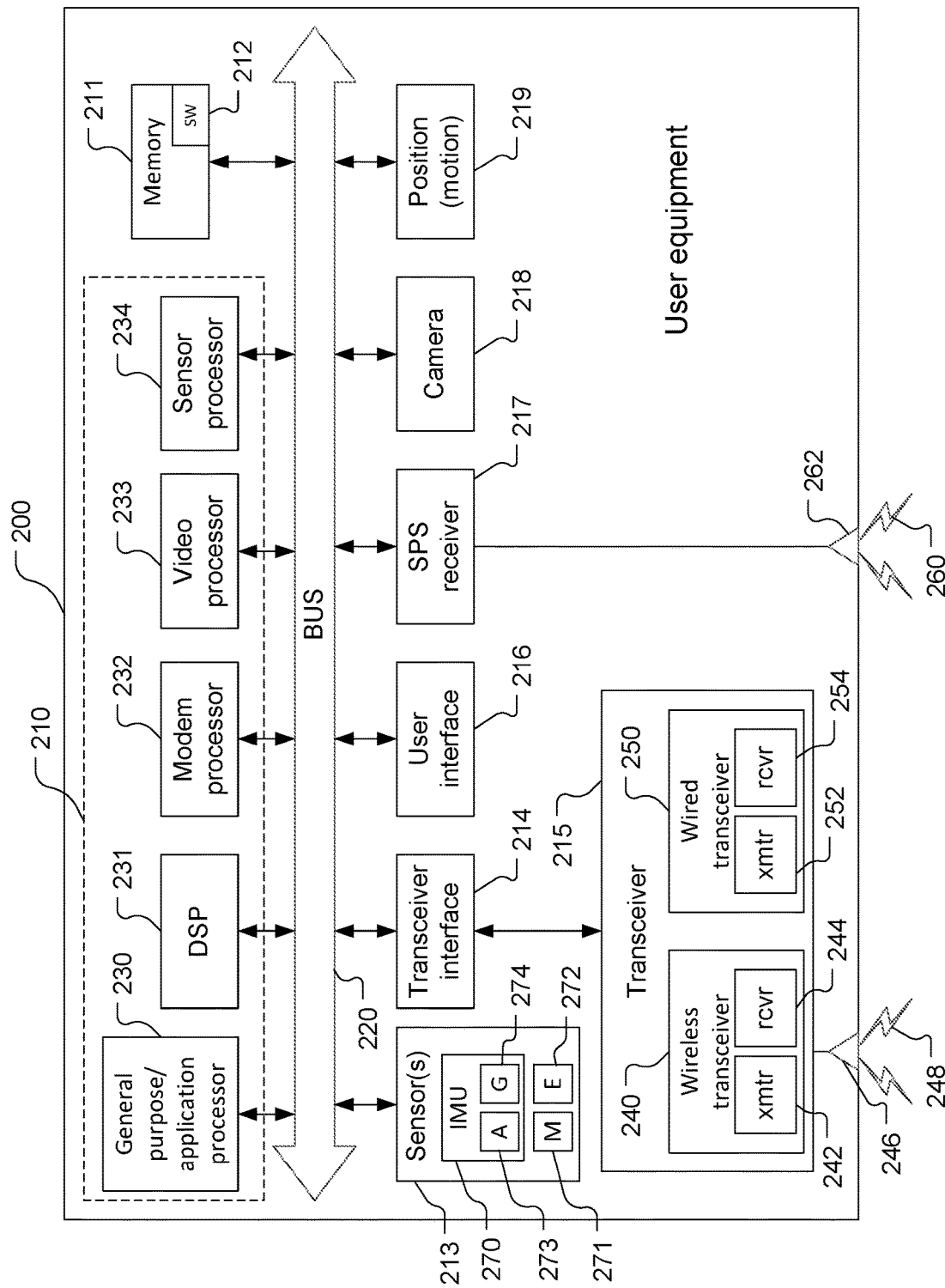
FIG. 2 is a block diagram of components of an example user equipment shown in FIG. 1.

Referring also to FIG. 2, a UE 200 is an example of the UE 105 and comprises a computing platform including a processor 210, memory 211 including software (SW) 212, one or more sensors 213, a transceiver interface 214 for a transceiver 215 (that includes a wireless transceiver 240 and a wired transceiver 250), a user interface 216, a Satellite Positioning System (SPS) receiver 217, a camera 218, and a position (motion) device 219. The processor 210, the memory 211, the sensor(s) 213, the transceiver interface 214, the user interface 216, the SPS receiver 217, the camera 218, and the position (motion) device 219 may be communicatively coupled to each other by a bus 220 (which may be configured, e.g., for optical and/or electrical communication). One or more of the shown apparatus (e.g., the camera 218, the position (motion) device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for radar, ultrasound, and/or lidar, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, the wireless transceiver 240, and one or more of the sensor(s) 213, the user interface 216, the SPS receiver 217, the camera 218, the PMD 219, and/or the wired transceiver 250.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the processor 230 and/or the DSP 231. Other configurations, however, may be used to perform baseband processing.

The UE 200 may include the sensor(s) 213 that may include, for example, an Inertial Measurement Unit (IMU) 270, one or more magnetometers 271, and/or one or more environment sensors 272. The IMU 270 may comprise one or more inertial sensors, for example, one or more accelerometers 273 (e.g., collectively responding to acceleration of the UE 200 in three dimensions) and/or one or more gyroscopes 274. The magnetometer(s) may provide measurements to determine orientation (e.g., relative to magnetic north and/or true north) that may be used for any of a variety of purposes, e.g., to support one or more compass applications. The environment sensor(s) 272 may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s) 213, the UE 200 may notify/report to the LMF 120 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/IMU can be used to determine the angle and/or orientation of the other device with respect to the UE 200, etc.

The IMU 270 may be configured to provide measurements about a direction of motion and/or a speed of motion of the UE 200, which may be used in relative location determination. For example, the one or more accelerometers 273 and/or the one or more gyroscopes 274 of the IMU 270 may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) 273 and gyroscope(s) 274 taken after this moment in time may be used in dead reckoning to determine present location of the UE 200 based on movement (direction and distance) of the UE 200 relative to the reference location.

The magnetometer(s) 271 may determine magnetic field strengths in different directions which may be used to determine orientation of the UE 200. For example, the orientation may be used to provide a digital compass for the UE 200. The magnetometer(s) 271 may include a two-dimensional magnetometer configured to detect and provide indications of magnetic field strength in two orthogonal dimensions. Also or alternatively, the magnetometer(s) 271 may include a three-dimensional magnetometer configured to detect and provide indications of magnetic field strength in three orthogonal dimensions. The magnetometer(s) 271 may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a transmitter 242 and receiver 244 coupled to one or more antennas 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. Thus, the transmitter 242 may include multiple transmitters that may be discrete components or combined/integrated components, and/or the receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), V2C (Uu), IEEE 802.11 (including IEEE 802.11p), WiFi, WiFi Direct (WiFi-D), Bluetooth®, Zigbee etc. New Radio may use mm-wave frequencies and/or sub-6 GHz frequencies. The wired transceiver 250 may include a transmitter 252 and a receiver 254 configured for wired communication, e.g., with the network 135 to send communications to, and receive communications from, the gNB 110*a*, for example. The transmitter 252 may include multiple transmitters that may be discrete components or combined/integrated components, and/or the receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The antenna 262 is configured to transduce the wireless SPS signals 260 to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position (motion) device (PMD) 219 may be configured to determine a position and possibly motion of the UE 200. For example, the PMD 219 may communicate with, and/or include some or all of, the SPS receiver 217. The PMD 219 may also or alternatively be configured to determine location of the UE 200 using terrestrial-based signals (e.g., at least some of the signals 248) for trilateration, for assistance with obtaining and using the SPS signals 260, or both. The PMD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PMD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the processor 230 and/or the DSP 231) may be configured to use to determine motion (e.g., a velocity vector and/or an acceleration vector) of the UE 200. The PMD 219 may be configured to provide indications of uncertainty and/or error in the determined position and/or motion.

Figure 3:
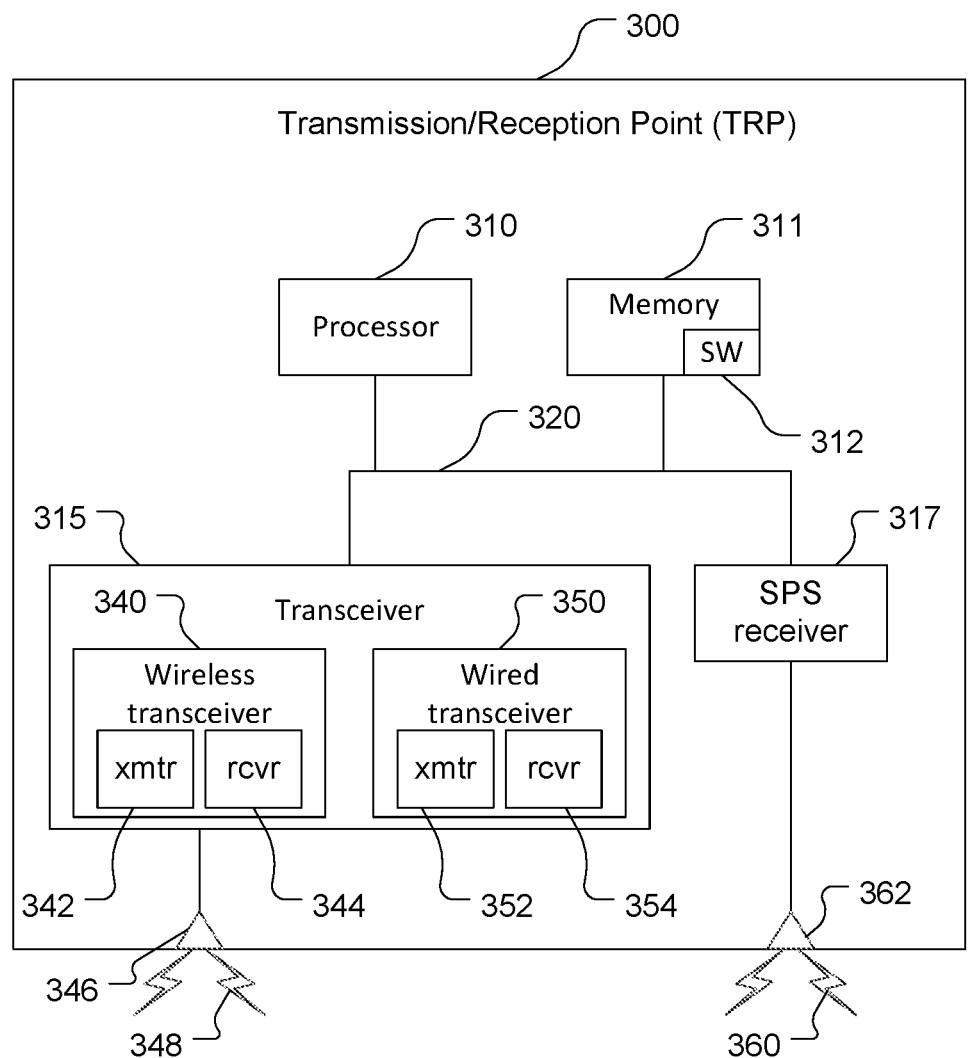
FIG. 3 is a block diagram of components of an example transmission/reception point shown in FIG. 1.

Referring also to FIG. 3, an example of a TRP 300 of the BSs 110a, 110b, 114 comprises a computing platform including a processor 310, memory 311 including software (SW) 312, a transceiver 315, and (optionally) an SPS receiver 317. The processor 310, the memory 311, the transceiver 315, and the SPS receiver 317 may be communicatively coupled to each other by a bus 320 (which may be configured, e.g., for optical and/or electrical communication). One or more of the shown apparatus (e.g., a wireless interface and/or the SPS receiver 317) may be omitted from the TRP 300. The SPS receiver 317 may be configured similarly to the SPS receiver 217 to be capable of receiving and acquiring SPS signals 360 via an SPS antenna 362. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions. The description may refer to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components of the TRP 300 (and thus of one of the BSs 110a, 110b, 114) performing the function. The processor 310 may include a memory with stored instructions in addition to and/or instead of the memory 311. Functionality of the processor 310 is discussed more fully below.

The transceiver 315 may include a wireless transceiver 340 and a wired transceiver 350 configured to communicate with other devices through wireless connections and wired connections, respectively. For example, the wireless transceiver 340 may include a transmitter 342 and receiver 344 coupled to one or more antennas 346 for transmitting (e.g., on one or more uplink channels) and/or receiving (e.g., on one or more downlink channels) wireless signals 348 and transducing signals from the wireless signals 348 to wired (e.g., electrical and/or optical) signals and from wired (e.g., electrical and/or optical) signals to the wireless signals 348. Thus, the transmitter 342 may include multiple transmitters that may be discrete components or combined/integrated components, and/or the receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a transmitter 352 and a receiver 354 configured for wired communication, e.g., with the network 140 to send communications to, and receive communications from, the LMF 120, for example. The transmitter 352 may include multiple transmitters that may be discrete components or combined/integrated components, and/or the receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 is configured to perform or performs several functions, but one or more of these functions may be performed by the LMF 120 and/or the UE 200 (i.e., the LMF 120 and/or the UE 200 may be configured to perform one or more of these functions).

Figure 4:
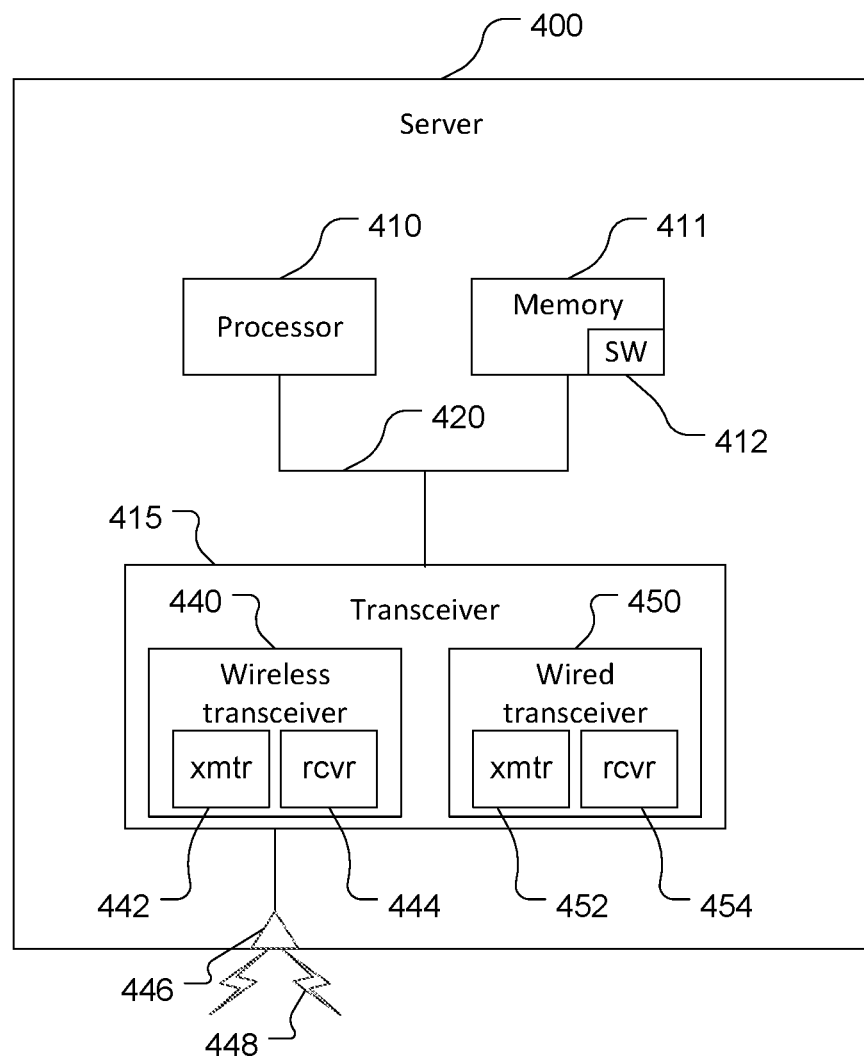
FIG. 4 is a block diagram of components of an example server shown in FIG. 1.

Referring also to FIG. 4, an example of the LMF 120 comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless interface) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 (or the LMF 120) performing a function as shorthand for one or more appropriate components of the server 400 (e.g., the LMF 120) performing the function. The processor 410 may include a memory with stored instructions in addition to and/or instead of the memory 411. Functionality of the processor 410 is discussed more fully below.

The transceiver 415 may include a wireless transceiver 440 and a wired transceiver 450 configured to communicate with other devices through wireless connections and wired connections, respectively. For example, the wireless transceiver 440 may include a transmitter 442 and receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the transmitter 442 may include multiple transmitters that may be discrete components or combined/integrated components, and/or the receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a transmitter 452 and a receiver 454 configured for wired communication, e.g., with the network 135 to send communications to, and receive communications from, the TRP 300, for example. The transmitter 452 may include multiple transmitters that may be discrete components or combined/integrated components, and/or the receiver 454 may include multiple receivers that may be discrete components or combined/integrated components. The wired transceiver 450 may be configured, e.g., for optical communication and/or electrical communication.

The configuration of the server 400 shown in FIG. 4 is an example and not limiting of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

Figure 5:
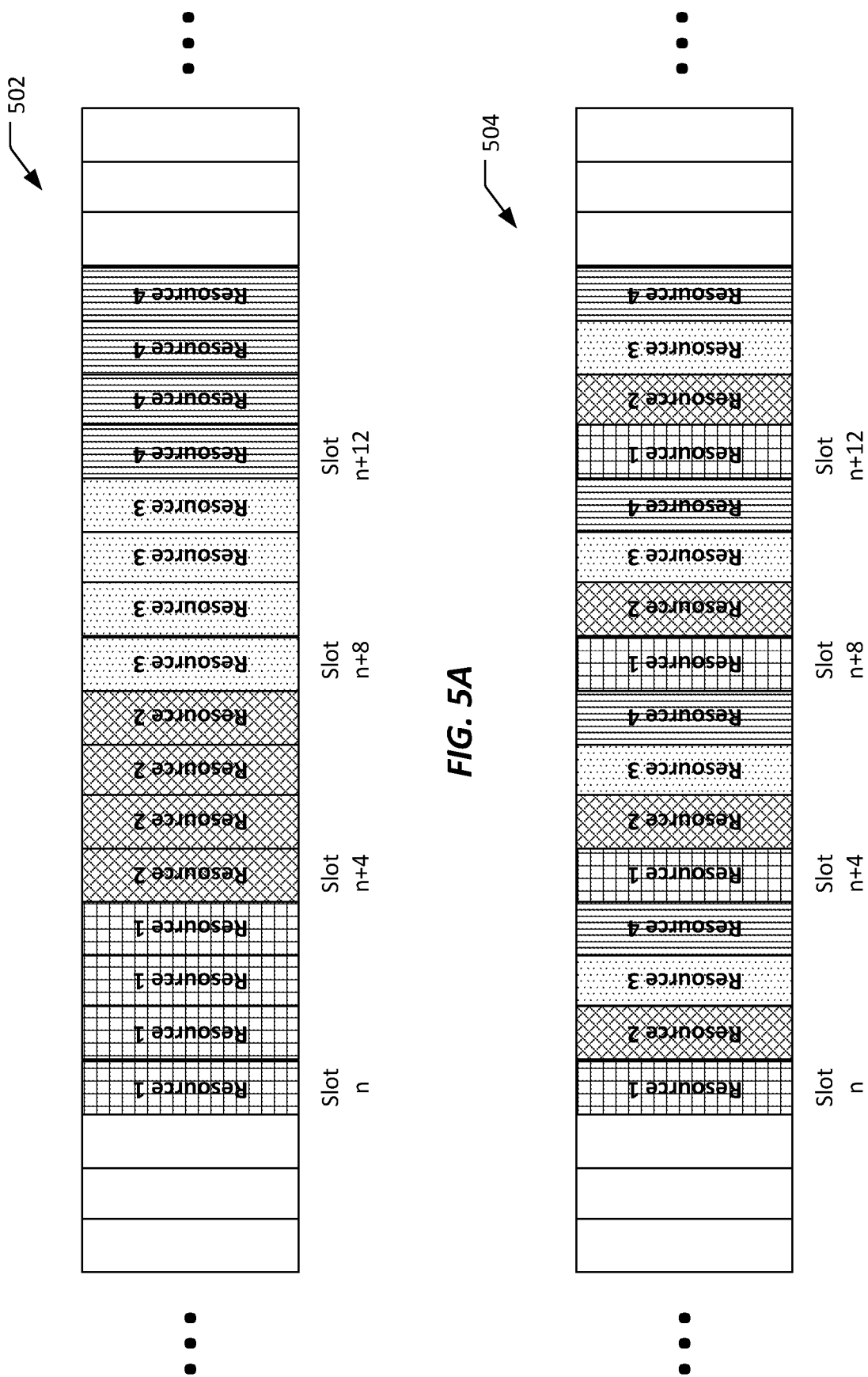
FIGS. 5A and 5B illustrate example downlink positioning reference signal resource sets.

Referring to FIGS. 5A and 5B, example downlink PRS resource sets are shown. In general, a PRS resource set is a collection of PRS resources across one base station (e.g., TRP 300) which have the same periodicity, a common muting pattern configuration and the same repetition factor across slots. A first PRS resource set 502 includes 4 resources and a repetition factor of 4, with a time-gap equal to 1 slot. A second PRS resource set 504 includes 4 resources and a repetition factor of 4 with a time-gap equal to 4 slots. The repetition factor indicates the number of times each PRS resource is repeated in each single instance of the PRS resource set (e.g., values of 1, 2, 4, 6, 8, 16, 32). The time-gap represents the offset in units of slots between two repeated instances of a PRS resource corresponding to the same PRS resource ID within a single instance of the PRS resource set (e.g., values of 1, 2, 4, 8, 16, 32). The time duration spanned by one PRS resource set containing repeated PRS resources does not exceed PRS-periodicity. The repetition of a PRS resource enables receiver beam sweeping across repetitions and combining RF gains to increase coverage. The repetition may also enable intra-instance muting.

Figure 6:
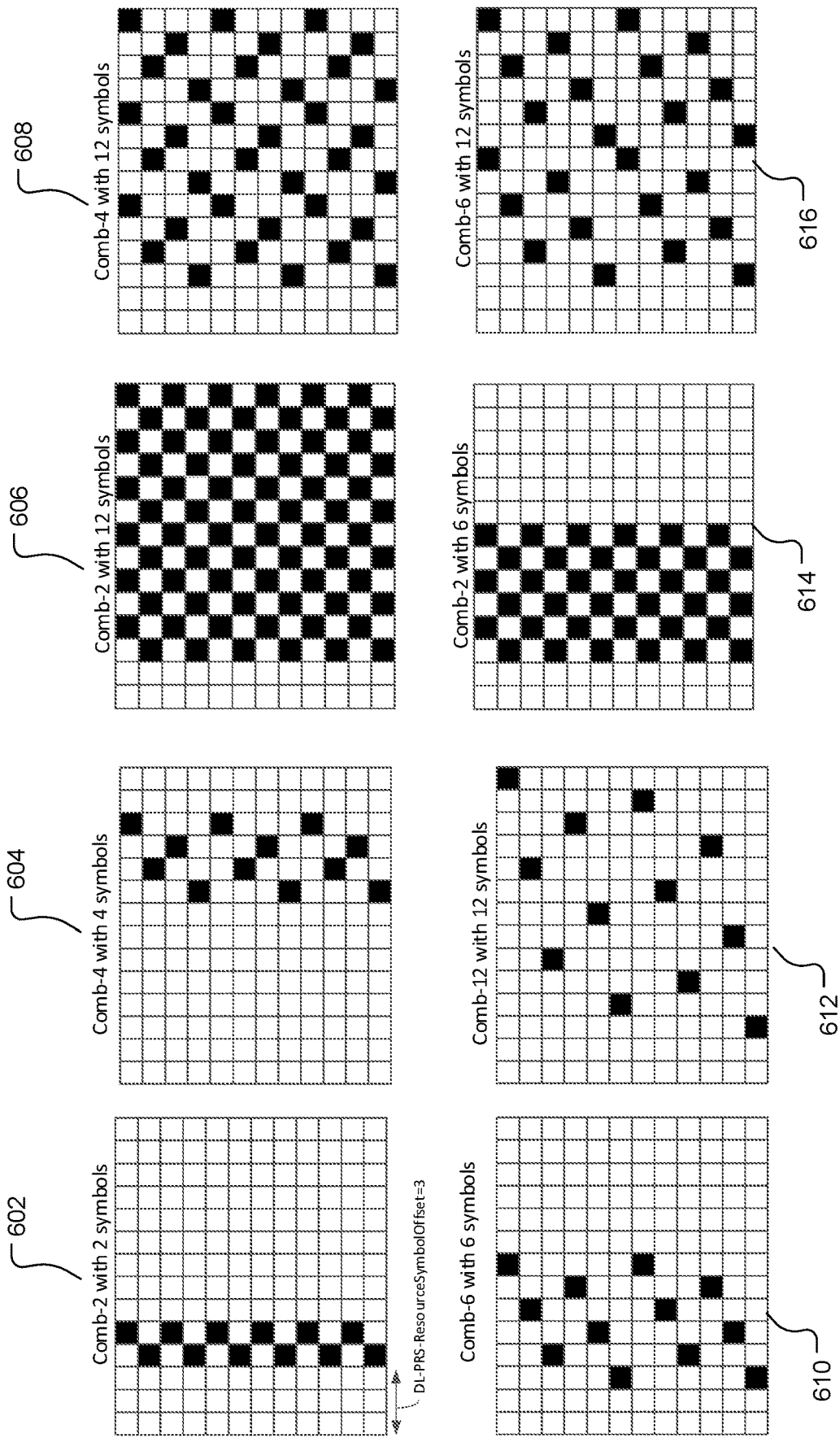
FIG. 6 is an illustration of example subframe formats for positioning reference signal transmission.

Referring to FIG. 6, example subframe and slot formats for positioning reference signal transmissions are shown. The example subframe and slot formats are included in the PRS resource sets depicted in FIGS. 5A and 5B. The subframes and slot formats in FIG. 6 are examples and not limitations and include a comb-2 with 2 symbols format 602, a comb-4 with 4 symbols format 604, a comb-2 with 12 symbols format 606, a comb-4 with 12 symbols format 608, a comb-6 with 6 symbols format 610, a comb-12 with 12 symbols format 612, a comb-2 with 6 symbols format 614, and a comb-6 with 12 symbols format 616. In general, a subframe may include 14 symbol periods with indices 0 to 13. The subframe and slot formats may be used for a Physical Broadcast Channel (PBCH). Typically, a base station may transmit the PRS from antenna port 6 on one or more slots in each subframe configured for PRS transmission. The base station may avoid transmitting the PRS on resource elements allocated to the PBCH, a primary synchronization signal (PSS), or a secondary synchronization signal (SSS) regardless of their antenna ports. The cell may generate reference symbols for the PRS based on a cell ID, a symbol period index, and a slot index. Generally, a UE may be able to distinguish the PRS from different cells.

A base station may transmit the PRS over a particular PRS bandwidth, which may be configured by higher layers. The base station may transmit the PRS on subcarriers spaced apart across the PRS bandwidth. The base station may also transmit the PRS based on the parameters such as PRS periodicity TPRS, subframe offset PRS, and PRS duration NPRS. PRS periodicity is the periodicity at which the PRS is transmitted. The PRS periodicity may be, for example, 160, 320, 640 or 1280 ms. Subframe offset indicates specific subframes in which the PRS is transmitted. And PRS duration indicates the number of consecutive subframes in which the PRS is transmitted in each period of PRS transmission (PRS occasion). The PRS duration may be, for example, 1, 2, 4 or 6 ms.

The PRS periodicity TPRS and the subframe offset PRS may be conveyed via a PRS configuration index IPRS. The PRS configuration index and the PRS duration may be configured independently by higher layers. A set of NPRS consecutive subframes in which the PRS is transmitted may be referred to as a PRS occasion. Each PRS occasion may be enabled or muted, for example, the UE may apply a muting bit to each cell. A PRS resource set is a collection of PRS resources across a base station which have the same periodicity, a common muting pattern configuration, and the same repetition factor across slots (e.g., 1, 2, 4, 6, 8, 16, 32 slots).

In general, the PRS resources depicted in FIGS. 5A and 5B may be a collection of resource elements that are used for transmission of PRS. The collection of resource elements can span multiple physical resource blocks (PRBs) in the frequency domain and N (e.g., 1 or more) consecutive symbol(s) within a slot in the time domain. In a given OFDM symbol, a PRS resource occupies consecutive PRBs. A PRS resource is described by at least the following parameters: PRS resource identifier (ID), sequence ID, comb size-N, resource element offset in the frequency domain, starting slot and starting symbol, number of symbols per PRS resource (i.e., the duration of the PRS resource), and QCL information (e.g., QCL with other DL reference signals). Currently, one antenna port is supported. The comb size indicates the number of subcarriers in each symbol carrying PRS. For example, a comb-size of comb-4 means that every fourth subcarrier of a given symbol carries PRS.

A PRS resource set is a set of PRS resources used for the transmission of PRS signals, where each PRS resource has a PRS resource ID. In addition, the PRS resources in a PRS resource set are associated with the same transmission-reception point (e.g., a TRP 300). A PRS resource set is identified by a PRS resource set ID and may be associated with a particular TRP (identified by a cell ID) transmitted by an antenna panel of a base station. A PRS resource ID in a PRS resource set is associated with a single beam (and/or beam ID) transmitted from a single base station (where a base station may transmit one or more beams). Each PRS resource of a PRS resource set may be transmitted on a different beam and as such, a PRS resource, or simply resource can also be referred to as a beam. Note that this does not have any implications on whether the base stations and the beams on which PRS are transmitted are known to the UE.

In an example, a positioning frequency layer may be a collection of PRS resource sets across one or more base stations. The positioning frequency layer may have the same subcarrier spacing (SCS) and cyclic prefix (CP) type, the same point-A, the same value of DL PRS Bandwidth, the same start PRB, and the same value of comb-size. The numerologies supported for PDSCH may be supported for PRS.

A PRS occasion is one instance of a periodically repeated time window (e.g., a group of one or more consecutive slots) where PRS are expected to be transmitted. A PRS occasion may also be referred to as a PRS positioning occasion, a positioning occasion, or simply an occasion.

Note that the terms positioning reference signal and PRS are reference signals that can be used for positioning, such as but not limited to, PRS signals in LTE, navigation reference signals (NRS) in 5G, downlink position reference signals (DL-PRS), uplink position reference signals (UL-PRS), tracking reference signals (TRS), cell-specific reference signals (CRS), channel state information reference signals (CSI-RS), primary synchronization signals (PSS), secondary synchronization signals (SSS), sounding reference signals (SRS), etc.

Figure 7:
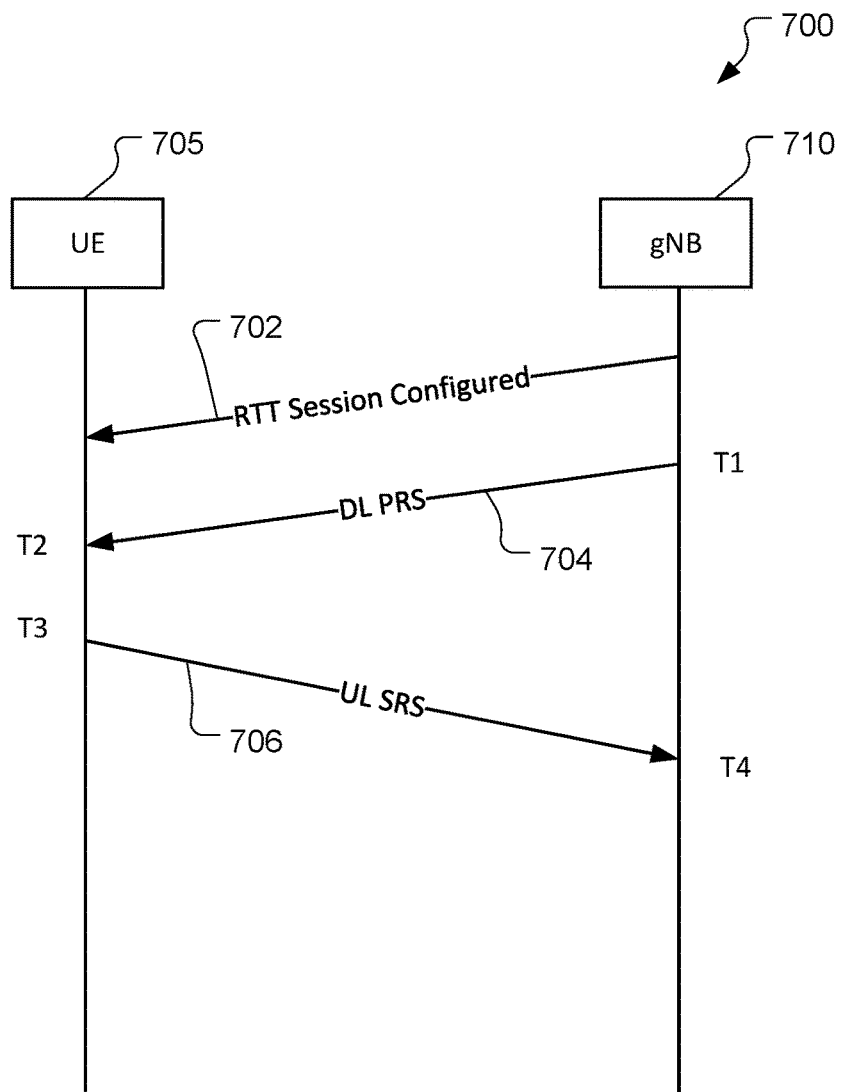
FIG. 7 is an example round trip time message flow between a user equipment and a base station.

Referring to FIG. 7, an example round trip message flow 700 between a user equipment 705 and a base station 710 is shown. The UE 705 is an example of the UE 105, 200 and the base station 710 may be a gNB 110a-b or ng-eNB 114. In general, RTT positioning methods utilize a time for a signal to travel from one entity to another and back to determine a range between the two entities. The range, plus a known location of a first one of the entities and an angle between the two entities (e.g., an azimuth angle) can be used to determine a location of the second of the entities. In multi-RTT (also called multi-cell RTT), multiple ranges from one entity (e.g., a UE) to other entities (e.g., TRPs) and known locations of the other entities may be used to determine the location of the one entity. The example message flow 700 may be initiated by the base station 710 with a RTT session configured message 702. The base station may utilize the LPP/NRPPa messaging to configure the RTT session. At time T1, the base station 710 may transmit a DL PRS 704, which is received by the UE 705 at time T2. In response, the UE 705 may transmit a Sounding Reference Signal (SRS) for positioning message 706 at time T3 which is received by the base station 710 at time T4. The distance between the UE 705 and the base station 710 may be computed as:

$$\text{distance} = \frac{c}{2}((T4 - T1) - (T3 - T2)) \quad (1)$$

where c=speed of light.

In dense operating environments, where there are many UEs exchanging RTT messages with base stations, the bandwidth required for the UL SRS for positioning messages may increase the messaging overhead and utilize excess network bandwidth. Passive positioning techniques may reduce the bandwidth required for positioning by eliminating transmissions from the UE.

Figure 8:
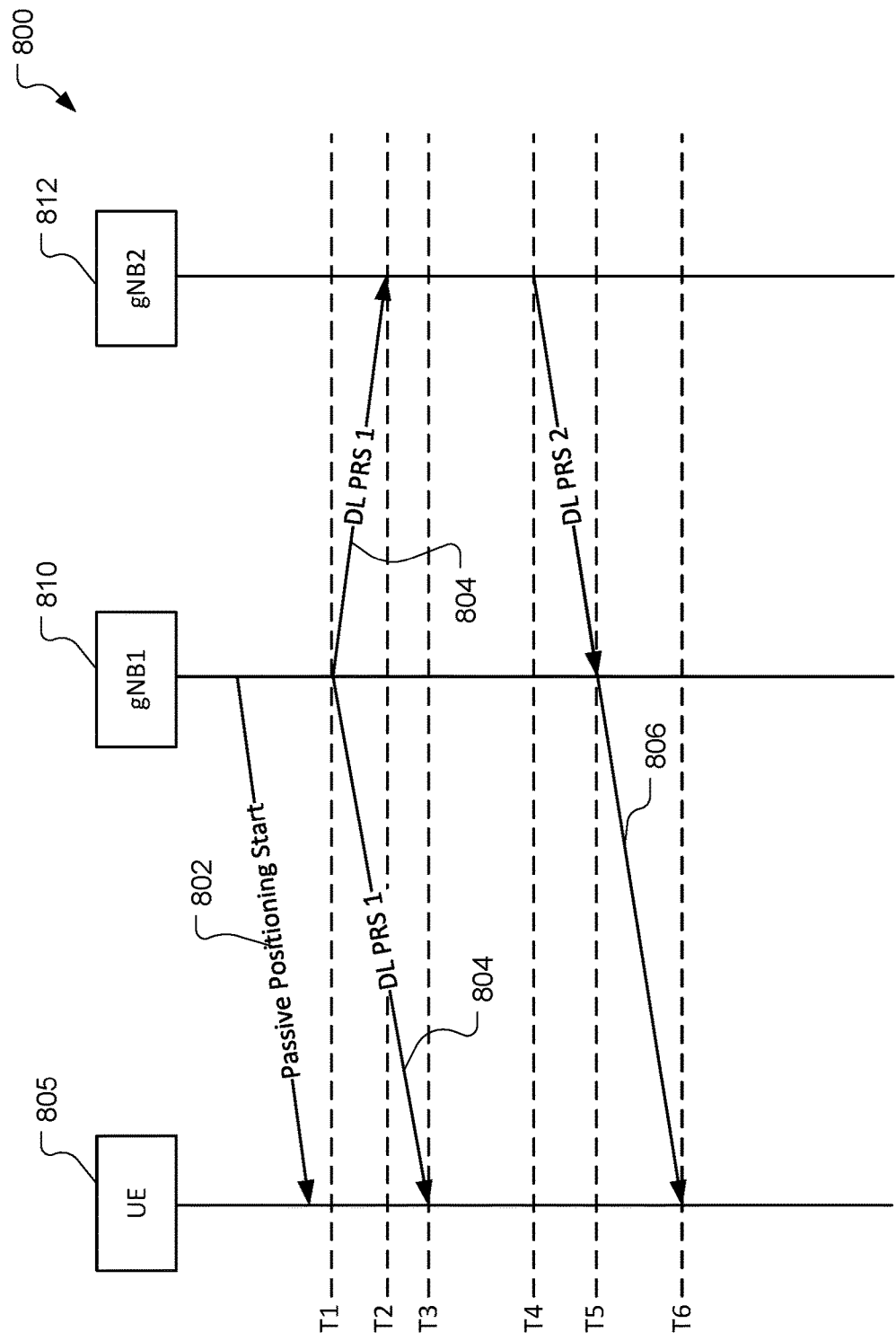
FIG. 8 is an example message flow for passive positioning of a user equipment.

Referring to FIG. 8, an example message flow 800 for passive positioning of a user equipment 805 is shown. The message flow includes the UE 805, a first base station 810 and a second base station 812. The UE 805 is an example of the UEs 105, 200, and the base stations 810, 812 are examples of the gNBs 110a-b or ng-eNB 114. In general, TDOA positioning techniques utilize the difference in travel times between one entity and other entities to determine relative ranges from the other entities and those, combined with known locations of the other entities may be used to determine the location of the one entity. Angles of arrival and/or departure may be used to help determine a location of an entity. For example, an angle of arrival or an angle of departure of a signal combined with a range between devices (determined using signal, e.g., a travel time of the signal, a received power of the signal, etc.) and a known location of one of the devices may be used to determine a location of the other device. The angle of arrival or departure may be an azimuth angle relative to a reference direction such as true north. The angle of arrival or departure may be a zenith angle relative to directly upward from an entity (i.e., relative to radially outward from a center of Earth). In operation, the first base station 810 may provide a passive positioning start message 802 to the UE 805. The passive positioning start message 802 may be a broadcast message, or other signaling such as RRC, to inform the UE of a PRS transmission schedule and may include transmission information (e.g., channel information, muting patterns, PRS bandwidth, PRS identification information, etc.). At time T1, the first station may transmit a first DL PRS 804 which may be received by the second base station 812 at time T2 (for example), and by the UE 805 at time T3. The second base station 812 may be configured to transmit a second DL PRS 806 at time T4, which is received by the first base station 810 at time T5 and by the UE 805 at time T6. The time between T2 and T4 may be a configured turnaround time on the second base station 812 and thus a known period of time. The time between T1 and T2 (i.e., time of flight) may also be known because the first and second base stations 810, 812 are in fixed locations. The turnaround time (i.e., T4-T2) and the time of flight (i.e., T2-T1) may be broadcast or otherwise provided to the UE 805 for use in positioning calculations. The UE 805 may observe the difference between T6 and T3, and the distances may be computed as:

$$D_{gNB1-UE} = \frac{c}{2}((T_3 - T_1)) \quad (2)$$

$$D_{gNB2-UE} = \frac{c}{2}((T_6 - T_1) - (T_4 - T_2) - (T_2 - T_1)) = \frac{c}{2}(T_6 - T_4) \quad (3)$$

$$D_{gNB2-UE} - D_{gNB1-UE} = \frac{c}{2}((T_6 - T_3) - (T_4 - T_2) - (T_2 - T_1)) \quad (4)$$

The message flow 800 is generally adequate when the first base station 810 and the second base station 812 have a LOS transmission path between one another and the internal timelines are aligned. If the timelines between the two stations are not aligned, and/or if a LOS path between the stations is not reliable, the accuracy of the distance calculations may be reduced. A timeline calibration value may be included in the calculations to modify the time of one of the stations to improve accuracy and reduce the dependence on a LOS communication path between the stations.

Figure 9:
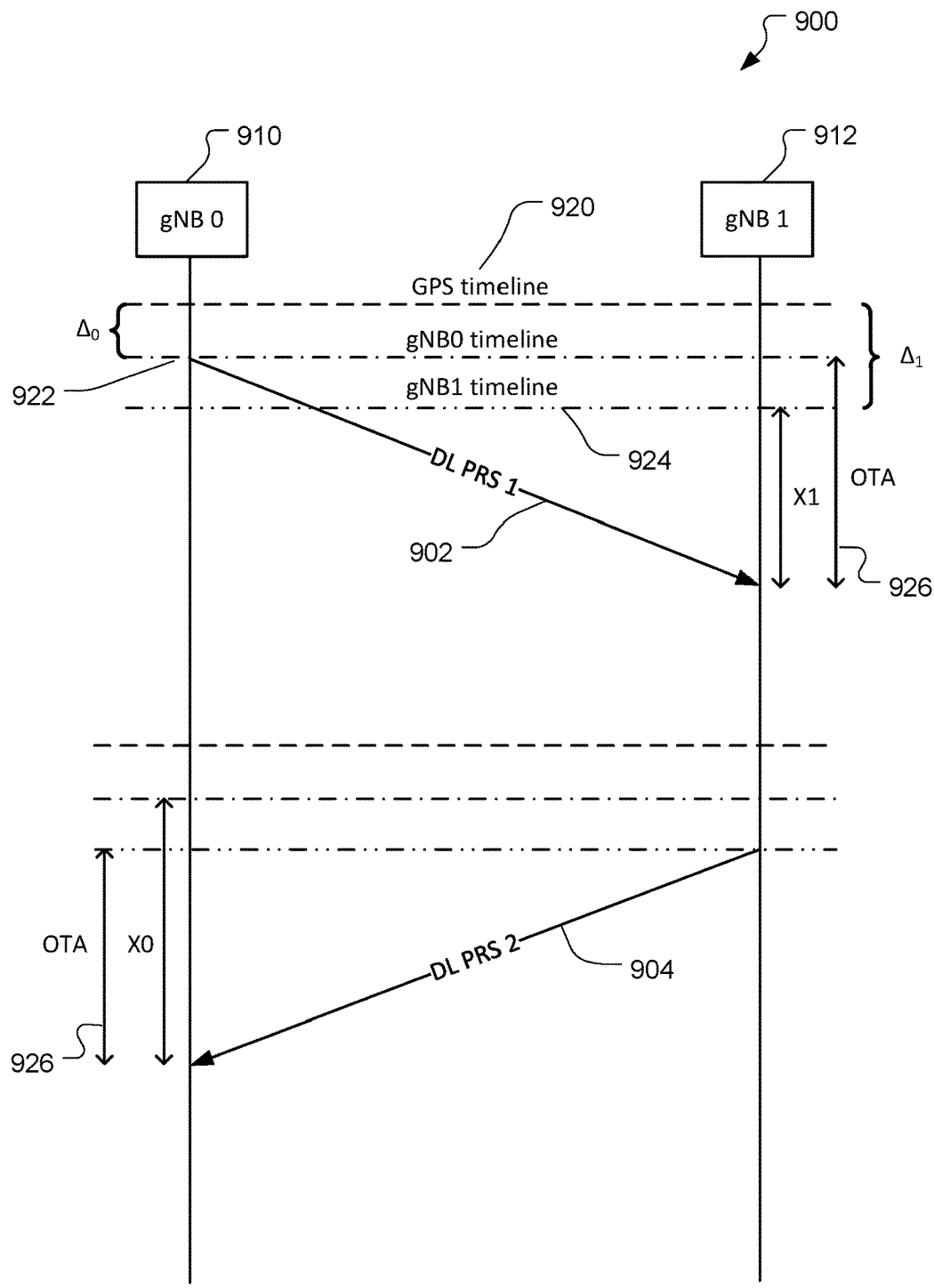
FIG. 9 is an example message flow between stations with a timeline difference value.

Referring to FIG. 9, an example message flow 900 between stations with a timeline difference is shown. The message flow 900 includes a first base station 910 and a second base station 912. The base stations 910, 912 are TRPs 300 such as the gNBs 110a-b or ng-eNBs 114. The base stations 910, 912 are configured to transmit PRS resources such as depicted in FIGS. 5A-5B. The PRS resources may be on the same frequency layer or on different frequency layers. In an example, the PRS may be an on-demand PRS (e.g., user or group specific), and/or may support different technologies such as LTE and NR (e.g., dynamic spectrum sharing). For example, the first base station 910 may be configured for LTE and the second base station 912 may be configured for 5G NR (e.g., mmW). In an example, one or both of the base stations 910, 912 may be configured for either or both LTE and 5G NR operations. The message flow 900 includes transmitting a first DL PRS 902 based on a first timeline 922 (i.e., the gNB0 timeline). The first DL PRS 902 is receive by the second station 912 based on a second timeline 924 (i.e., the gNB1 timeline). The first timeline 922 may have an unknown error $\Delta_0$ as compared to a standard timeline 920 (e.g., the GPS timeline), and the second timeline 924 may have an unknown error $\Delta_1$ as compared to the standard timeline 920. The errors $\Delta_0$ and $\Delta_1$ may be time varying. The first station 910 measures the DL PRS 902 and determines the arrival path based on the first timeline 922. A first time of flight value based on the arrival time X1 is underestimated as compared to the actual Over the Air (OTA) value 926 due to the difference in the timeline errors associated with the first and second stations 910, 912. The arrival time X1 and the timeline errors are related such that:

$$X_1 + \Delta_1 = \Delta_0 + OTA \quad (5)$$

The second station 912 sends a second DL PRS 904 to the first station 910 and measures the arrival path based on the second timeline 924. The arrival time X0 is an overestimate as compared to the OTA value 926. The arrival time X0 and the timeline errors are related such that:

$$X_0 + \Delta_0 = \Delta_1 + OTA \quad (6)$$

A timeline difference value between the first station 910 and the second station 912 may be computed as:

$$\Delta_1 - \Delta_0 = OTA - X_1 = X_0 - OTA = \frac{X_0 - X_1}{2} \quad (7)$$

The resulting timeline difference value ($\Delta_1 - \Delta_0$) may be provided to the UEs to calibrate the results of OTDOA measurements of the DL PRS transmissions received from the first station 910 and the second station 912 respectively.

The timeline difference value may be determine based on using the same transmission path between the first station 910 and the second station 912. That is, the equations (5)-(7) are not dependent on a specific OTA value based on a LOS path. Any path, such as the path with the highest signal, may be used provided it is used in both directions. The measurements of the first and second DL PRSs 902, 904 should be as close as possible to reduce errors associated with path changes. The timeline difference value may be computed for various iterations of performance capabilities of a the stations 910, 912. For example, a timeline difference value may be determined on one frequency layer and then used on other frequency layers. Variations of antenna panels may impact the timeline difference value (e.g., based on different RF chain controllers) and different panels may be associated with separate timeline difference values.

In operation, in an example, a network resource such as the LMF 120 may designate sets of master base stations to perform the timing synchronization procedure described above. Each master base station may perform the procedure with several secondary base stations to determine a respective timeline difference value for each master-secondary station relationship. The sets of master base stations may change over time and the network (e.g., LMF 120) may provide configuration information to the base stations to enable the coordination of the timing synchronization procedures. In an example, each of the master base stations may be assigned multiple PRS resource sets, with each set including multiple PRS resources. Each PRS resource set may indicate a pair of resource configurations including timeline difference values for transmission and receive operations with associated stations. In an example, multiple transmit and receive resource sets may be assigned base station pairings to enable multiple stations to respond to the same PRS from a station.

A timeline difference value may be computed using other methods. For example, since the timeline difference value represents a timing drift, frequency based methods such as strongest path and Channel Frequency Response (CFR) may be used. Determining the LOS path is not necessary. In an example, waveform samples obtained at the base stations may be provided to a network server (e.g., the LMF 120, or other computer 400) for analysis. Convolution and other signal analysis algorithms may be used to determine the timeline difference value in the waveform samples. In an embodiment, as bandwidth and processing capabilities of UEs increase, a UE 200 may be configured to perform the waveform analysis. The waveform analysis may be used to determine the timeline difference values associated with base station installation factors, such as antenna configuration, element spacing, mounting conditions or other physical factors which may impact the transmission or reception of PRS.

Figure 10:
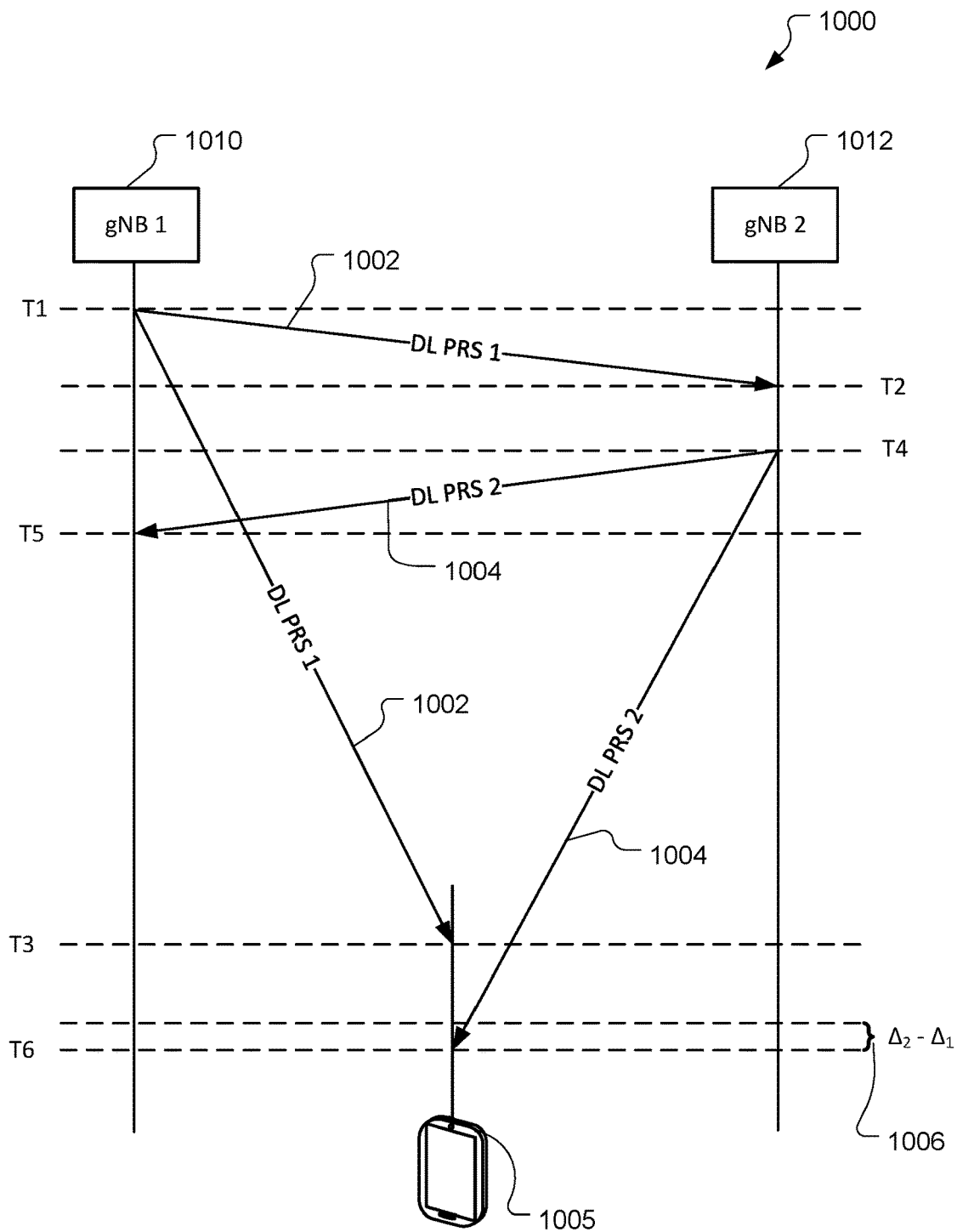
FIG. 10 is an example message flow for passive positioning with a timeline difference value.

Referring to FIG. 10, with further reference to FIGS. 8 and 9, an example message flow 1000 for passive positioning with a timeline difference value is shown. The message flow 1000 includes a first base station 1010, a second base station 1012 and a UE 1005. The base stations 1010, 1012 may be gNBs 110a-b or ng-eNBs 114 and the UE 1005 is an example of the UEs 105, 200. One or both of the base stations 1010, 1012, or a serving station, may broadcast or otherwise provide a timeline difference value 1006 and other assistance data (e.g., turnaround time, station locations) to the UE 1005, and the UE 1005 may be configured to apply the timeline difference value 1006 to the observed time difference. For example, using theoretical time points T1-T6, the first base station 1010 may transmit a first DL PRS 1002 at time T1, which may be received by the second base station 1012 at time T2 and by the UE 1005 at time T3. The second base station 1012 is configured to transmit a second DL PRS 1004 at time T4, which is received by the first base station 1010 at time T5 and by the UE 1005 at time T6. The UE 1005 is configured to apply the timeline difference value 1006 to the observed time difference (T6-T3). For example, the UE 1005 may increase or decrease the value of T6 based on the timeline difference value 1006. The UE 1005 is configured to utilize the timing and timing difference information to derive the RSTD values described in equations (2)-(4) above.

In an embodiment, one or more UEs may be in a fixed location and configured to perform some or all of the functions of the base stations described herein. For example, a UE may be configured to determine a location (e.g., using inertial, satellite and/or terrestrial techniques) and transmit positioning reference signals to neighboring base stations and/or UEs. The UEs in a network may be configured to transmit omnidirectional sounding reference signals (SRS) for positioning and/or beamformed SRS for positioning based on the capabilities of the network and/or the UE. For example, UEs configured for 5G sub 6 GHz operations may utilize omnidirectional signaling, and UEs configured for higher frequencies may utilize analog beam forming. The UE may transmit SRS for positioning with existing uplink and sidelink communication interfaces such as Uu and PC5, for example. A base station may be configured to perform the calibration procedure described in FIG. 9 with a stationary UE and compute the timeline difference value associated with the base station and the UE.

Figure 11:
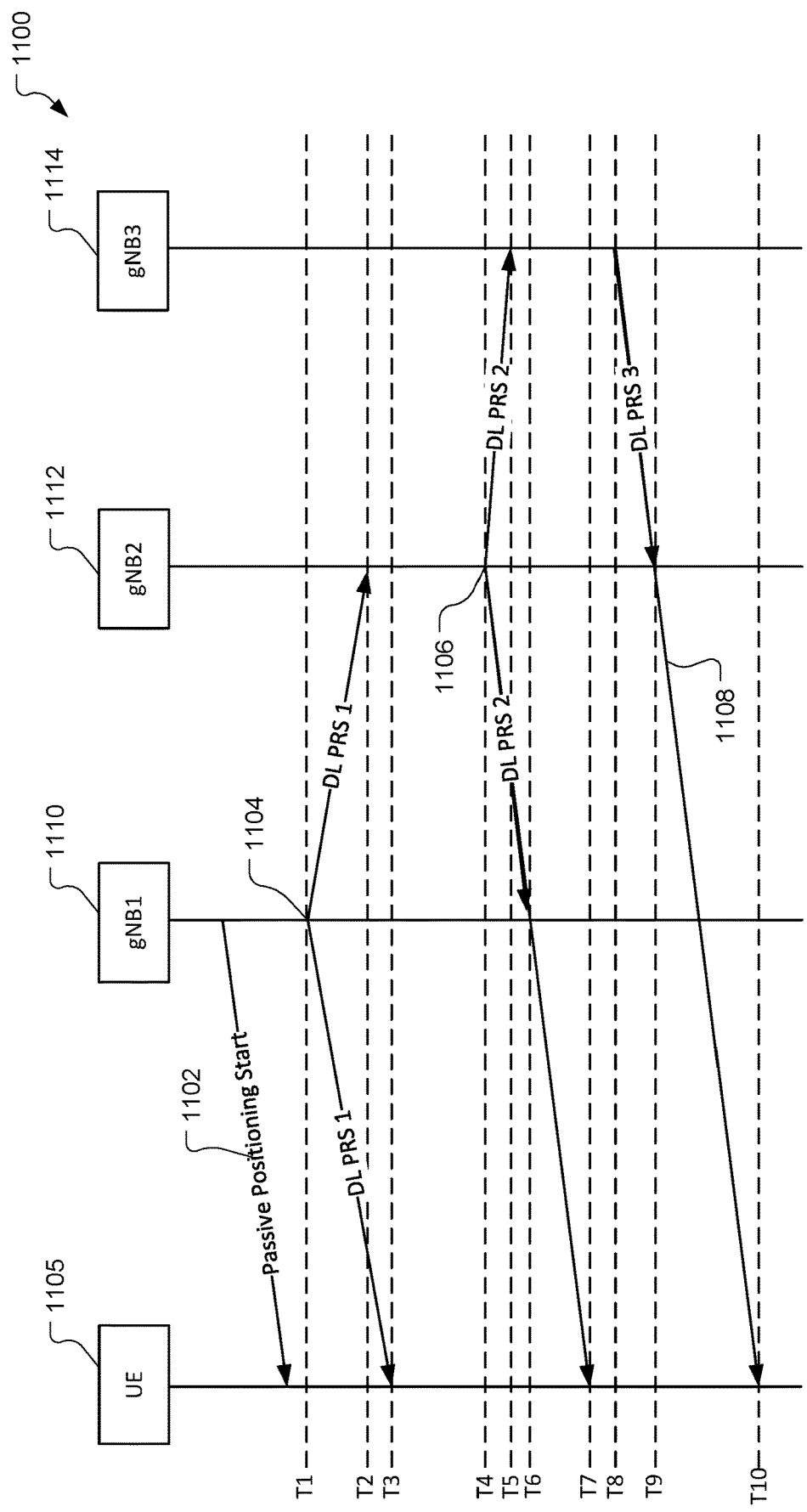
FIG. 11 is an example message flow for passive positioning with a plurality of base stations and respective timeline difference values.

Referring to FIG. 11, an example message flow 1100 for passive positioning with a plurality of base stations and respective timeline difference values is shown. The message flow 1100 includes a UE 1105, a first base station 1110, a second base station 1112, and a third base station 1114. The UE 1105 is an example of the UEs 105, 200, and the base stations 1110, 1112, 1114 are examples of the gNBs 110a-b or ng-eNB 114. The UE 1105 is in a position to receive PRS from each of the base stations 1110, 1112, 1114. The first base station 1110 may exchange PRS with the second base station 1112, and the second base station may exchange PRS with the third base station 1114. The first base station 1110 and the third base station 1114 are positioned such that they cannot exchange PRS with one another. The calibration procedures described herein may be derived without explicitly exchanging reference signals. For example, a first timeline difference value may be computed for the first base station 1110 and the second base station 1112, and a second timeline difference value may be computed for the second base station 1112 and the third base station 1114. A third timeline difference value associated with the first base station 1110 and the third base station 1114 may be derived based on the first and second timeline difference values. For example, in operation, the first base station 1110 may provide a passive positioning start message 1102 to the UE 1105. The passive positioning start message 1102 may be a broadcast message, or other signaling such as RRC, to inform the UE of a PRS transmission schedule and may include transmission information (e.g., timeline difference values, station locations, turnaround times, channel information, muting patterns, PRS bandwidth, PRS identification information, etc.). At time T1, the first station 1110 may transmit a first DL PRS 1104 which may be received by the second base station 1112 at time T2 (for example), and by the UE 1105 at time T3. The third base station 1114 does not receive the first DL PRS 1104. The second base station 1112 may be configured to transmit a second DL PRS 1106 at time T4, which is received by the third base station 1114 at time T5, by the first base station 1110 at time T6, and by the UE 1105 at time T7. The third base station 1114 may transmit a third DL PRS 1108 at time T8, which is received by the second base station 1112 at time T9 and by the UE 1005 at time T10. The time between T2 and T4 may be a configured turnaround time on the second base station 1112, and the time between T5 and T8 may be configured as a turnaround time on the third base station 1114, and thus known periods of time. The times of flight between the stations (e.g., T2-T1 and T5-T4) may also be known because the locations of the stations 1110, 1112, 1114 are also known. The UE 1105 may apply a first timeline difference value to the times T7 and T3 associated with the first and second stations 1110, 1112, and a second timeline difference value to the times T10 and T7 associated with the second and third base stations 1112, 1114. The UE 1105 may also apply a third timeline difference value to the times T10 and T3 associated with the first and third stations 1110, 1114. The third timeline difference value may be derived based on previous soundings between the first and second base stations 1110, 1112, and the second and third base stations 1112, 1114. The third timeline difference value may be received from the network in assistance data, or derived by the UE 1105 locally based on the first and second timeline difference values. The UE 1105 may utilize the respective time differences and corresponding timeline difference values to compute the distances as described in equations (2)-(4).

A network of base stations may be configured to compute timeline difference values for all pairs of base stations (e.g., via distributed consensus algorithms). The derivation process may be used to reduce signaling overhead but may increase the variance in the timeline difference values. A network resource (e.g., the LMF 120) may compute the timeline difference values for desired pairs of base stations and provide (e.g., broadcast/unicast) the values in assistance data. In an example, the network may provide timeline difference values based on measured pairs and the UEs may determine other timeline difference values using a local consensus algorithm. Measurement tiers may be used based on the number of derived values used. For example, tier 1 values may be based on an exchange of sounding signals, tier 2 values may be derived from two tier 1 values, tier 3 values may be derived from tier 2 values, etc. Variance and measurement quality values may be based on the tier levels. In an example, the LMF 120 may utilize the timeline difference values to compensate the turnaround times or other transmit or receive time delays such that the observed time difference will not need to be modified.

Figure 12:
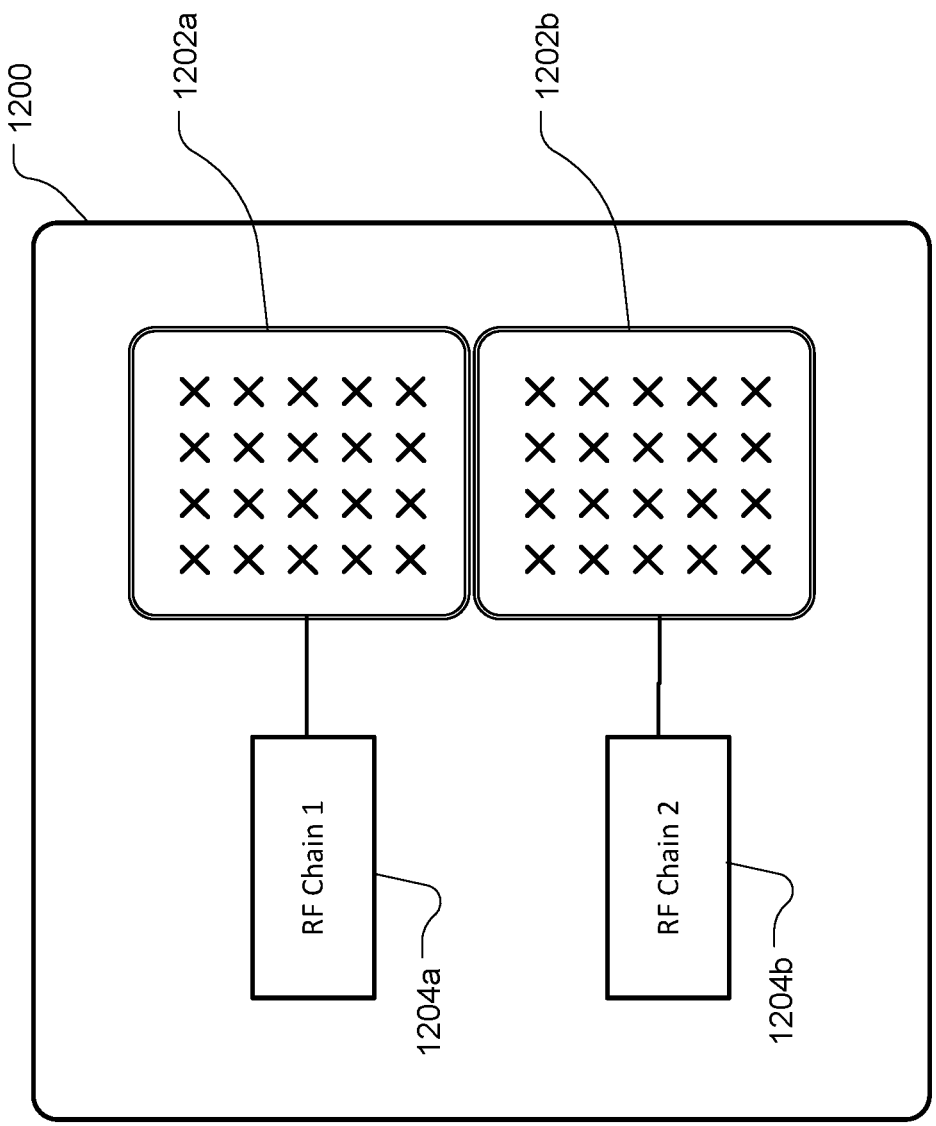
FIG. 12 is an illustration of an example of a station antenna element with multiple antenna panels.

Referring to FIG. 12, an example station antenna element 1200 with multiple antenna panels is shown. The antenna element 1200 includes a first panel 1202a and a second panel 1202b. The first panel 1202a is coupled to a first RF chain 1204a, and the second panel 1202b is coupled to a second RF chain 1204b. In general, when the first and second antenna panels 1202a-b are used for transmitting DL PRS to other base stations and to a UE, the timeline difference value computed based on the PRS exchange may be signaled to the UE. In other use cases, such as mmW and systems/multi-panel base stations, the antenna panels used for the PRS exchange may not be the same antenna panel used for the transmission to the UEs. In this use case, in an example, the base station may be configured to perform a self-calibration procedure to compute an RF delay differential between the paths for the different antenna ports. This may be required when the panels are coupled to different receive chains, such as depicted in FIG. 12. The resulting correction obtained from the self-calibration procedure may be reported to the LMF 120, or the UEs via assistance data. The correction value may be consistent and may be periodically reevaluated. In another example, timeline difference values may be obtained by performing PRS exchanges using all pairs of antenna panels 1202a-b. Thus, a timeline difference value may be associated with a particular panel in a base station and the network may be configured to provide the panel based timeline difference values to the UEs.

Figure 13:
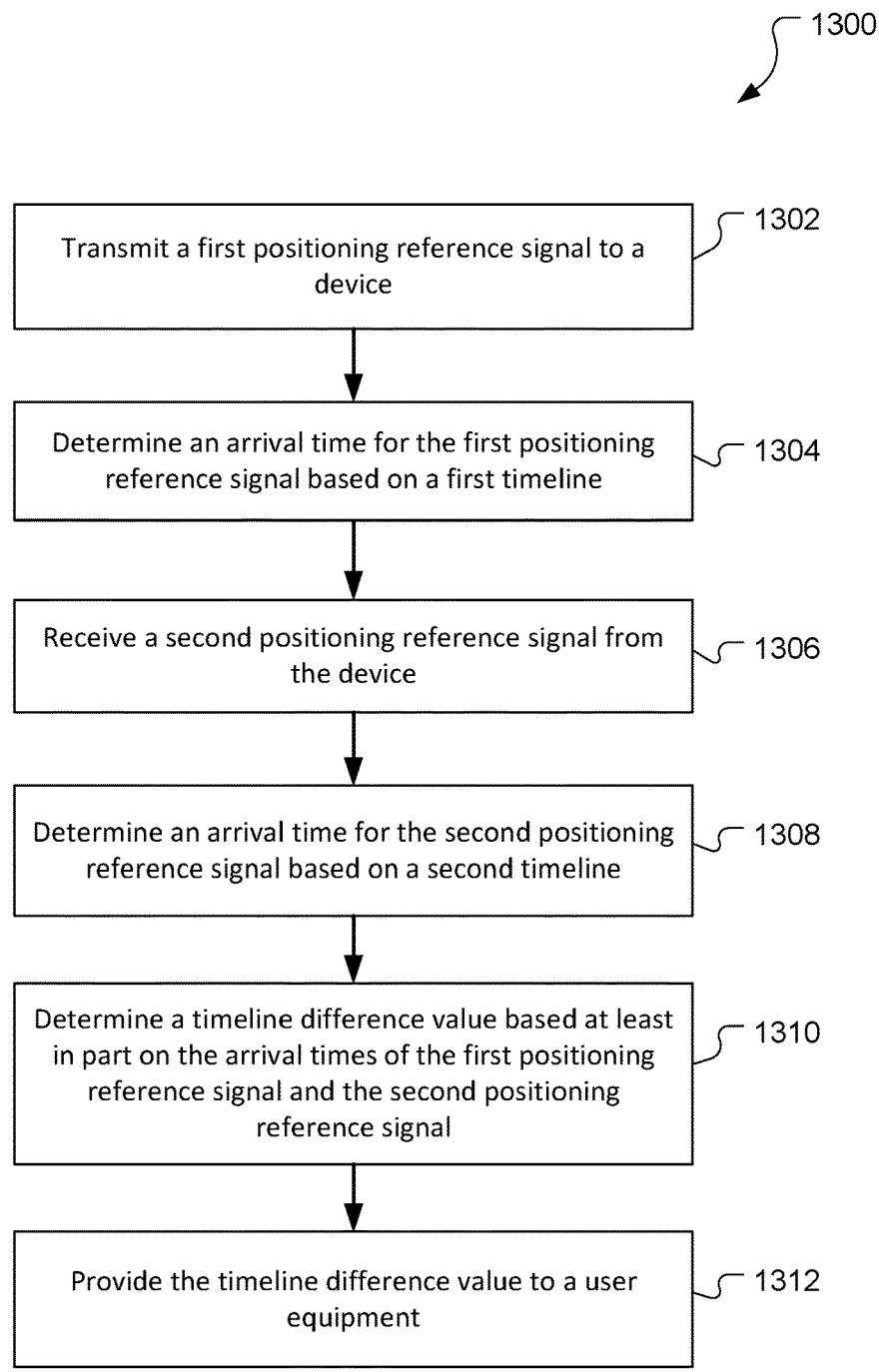
FIG. 13 is a process flow of an example method for providing a timeline difference value to a user equipment.

Referring to FIG. 13, with further reference to FIGS. 1-12, a method 1300 for providing a timeline difference value to a user equipment includes the stages shown. The method 1300 is, however, an example and not limiting. The method 1300 may be altered, e.g., by having stages added, removed, rearranged, combined, performed concurrently, and/or having single stages split into multiple stages.

At stage 1302, the method includes transmitting a first positioning reference signal to a device. A TRP 300, including the transceiver 315 and the processor 310, is a means for transmitting a first PRS. Referring to FIG. 9, the first station 910 is an example of a device such as a TRP 300 and is configured to transmit the first DL PRS 902 based on a first timeline 922. The first DL PRS 902 is received by the second station 912. In an example, a network resource such as the LMF 120 may instruct the first station 910 to transmit the first DL PRS 902 to begin a calibration procedure. The first station 910 may also be configured to perform the calibration procedure periodically, or based on a change in configuration or a change in the channel state. The device receiving the first PRS may be a base station or a user equipment.

At stage 1304, the method includes determining an arrival time for the first positioning reference signal based on a first timeline. The TRP 300, including the processor 310, is a means for determining the time of arrival. The first station 910 measures the DL PRS 902 and finds the arrival path based on the first timeline 922. The first timeline 922 may have an unknown error $\Delta_0$ as compared to a standard timeline 920 (e.g., a Genie/GPS timeline). The error $\Delta_0$ may be time varying. As depicted in FIG. 9, the arrival time is X1 from the measurement.

At stage 1306, the method includes receiving a second positioning reference signal from the device. The TRP 300, including the transceiver 315 and the processor 310, is a means for receiving the second PRS. The second station 912 is configured to transmit the second DL PRS 904 based on a second timeline 924. The second timeline 924 may have an unknown error $\Delta_1$ as compared to the standard timeline 920. The error $\Delta_1$ may be time varying. The second station 912 is configured to measure the second DL PRS 904 and find the arrival path based on the second timeline 924. As depicted in FIG. 9, the arrival time is X0 from the measurement.

At stage 1308, the method includes determining an arrival time for the second positioning reference signal based on a second timeline. The TRP 300, including the processor 310, is a means for determining an arrival time for the second PRS. In an example, the second station 912 determines the arrival path at its own timeline (e.g., the second timeline 924). The arrival time X1 may be provided to a network resource such as the LMF 120, or to the first station 910 via a backhaul or via over the air messaging.

At stage 1310, the method includes determining a timeline difference value based at least in part on the arrival times of the first positioning reference signal and the second positioning reference signal. The TRP 300, including the processor 310, is a means for computing a timeline difference. The first station 910 may utilize equation (7) to determine the timeline difference value to be (X0−X1)/2. In an example, a network server (e.g., the LMF 120) may perform the computations to determine the timeline difference value and provide the value to the first station 910. In an example, the timeline difference value may be determined by the LMF 120 based on waveforms provided by one or both of the stations 910, 912.

At stage 1312, the method includes providing the timeline difference value to a user equipment. The TRP 300, including the transceiver 315 and the processor 310, is a means for providing the timeline difference value. The first station 910 may broadcast or unicast the timeline difference value to a UE 200. For example, the timing difference value may be broadcast or provided in network signaling (e.g., RRC, LPP, NRPP, MAC-CE, SIBs, etc.). In an example, the timeline difference value may be included in a codebook stored locally on the UE 200, or in the TRP 300, based on identification values associated with the stations 910, 912, the DL PRS resources, or beam identification values (e.g., station IDs, PRS-IDs, beam-IDs). The UE 200 may utilize the timing difference value on OTDOA measurements based on DL PRS received from the first and second stations 910, 912.

Figure 14:
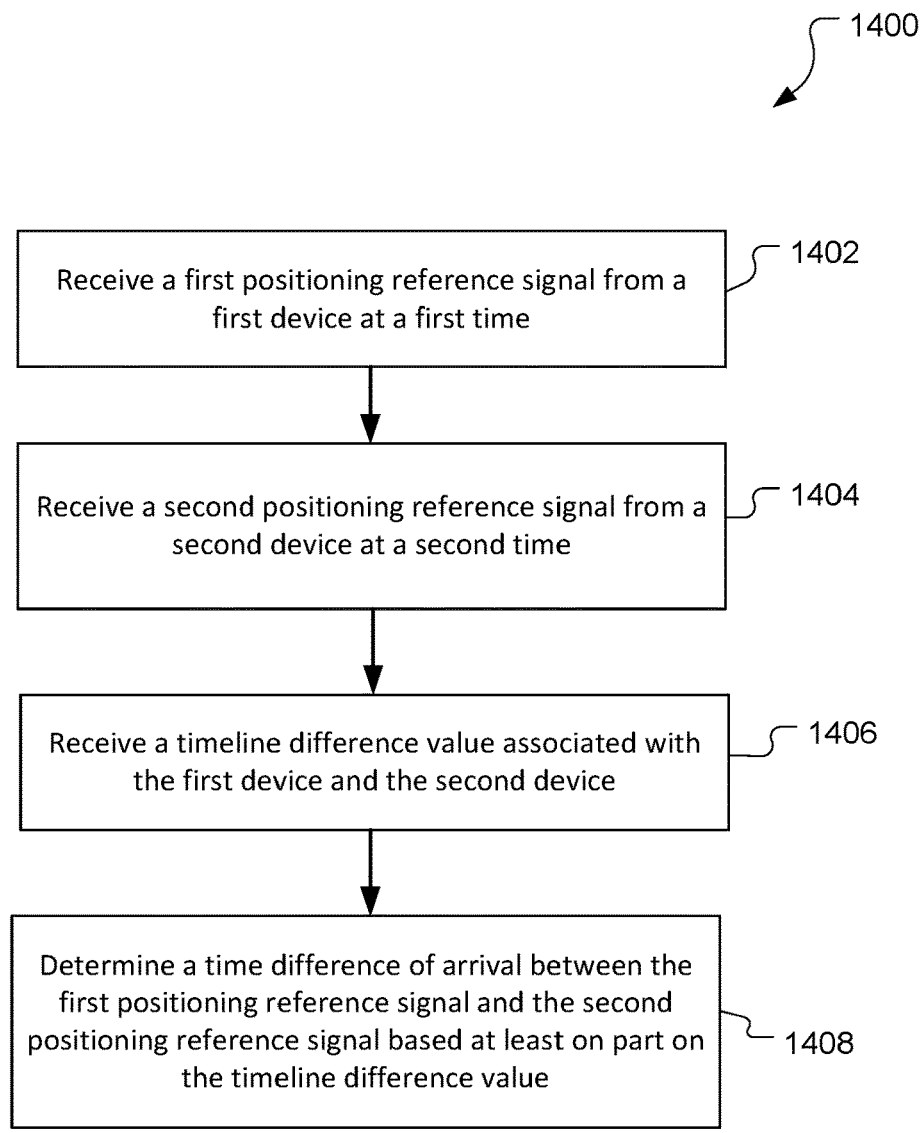
FIG. 14 is a process flow of an example method for passive positioning of a user equipment.

Referring to FIG. 14, with further reference to FIGS. 1-12, a method 1400 for passive positioning of a user equipment includes the stages shown. The method 1400 is, however, an example and not limiting. The method 1400 may be altered, e.g., by having stages added, removed, rearranged, combined, performed concurrently, and/or having single stages split into multiple stages.

At stage 1402, the method includes receiving a first positioning reference signal from a first device at a first time. The UE 200, including the transceiver 215 and the processor 230, is a means for receiving the first PRS. In an example, referring to FIG. 10, a TRP, such as a first station 1010 is configured to transmit a first DL PRS 1002 to a second TRP, such as the second station 1012. The UE 1005 may also receive the first DL PRS 1002 at time T3. The UE 1005 may be configured to select a DL PRS based on established PRS scheduling information. In an example, the first PRS may be a user or group specific on-demand PRS.

At stage 1404, the method includes receiving a second positioning reference signal from a second device at a second time. The UE 200, including the transceiver 215 and the processor 230, is a means for receiving the second PRS. In an example, a second TRP, such as the second station 1012 is configured to send a second DL PRS 1004, which is received by the UE 1006 at time T6. The UE may be configured to select the second DL PRS 1004 based on established PRS scheduling information. In an embodiment, the first and second PRS may be on the same frequency layer or on different frequency layers, and may utilize different technologies (e.g., LTE and 5G NR for dynamic spectrum sharing).

At stage 1406, the method includes receiving a timeline difference value associated with the first device and the second device. The UE 200, including the transceiver 215 and the processor 230, is a means for receiving the timeline difference value. The timeline difference value may be determine based on using the same transmission path between the first station 1010 and the second station 1012. The timeline difference value may be broadcast by the station 1010, 1012, a serving station, or by other base stations in a communication network. For example, the LMF 120 may be configured to provide the timeline difference value to the UE 200. Network signaling such as RRC may be used to provide the timeline difference value to the UE 200. For example, a timeline difference value may be determined on one frequency layer and then used on other frequency layers. Variations of antenna panels may impact the timeline difference value (e.g., based on different RF chain controllers) and different panels may be associated with separate timeline difference values.

At stage 1408, the method includes determining a time difference of arrival between the first positioning reference signal and the second positioning reference signal based at least in part on the timeline difference value. The UE 200, including the transceiver 215 and the processor 230, is a means for determining the time difference of arrival. The UE 200 may receive turnaround time and time of flight information associated with the first and second DL PRS transmissions 1002, 1004 from the stations 1010, 1012, serving station, or other network resources (e.g., the LMF 120) to perform RSTD measurements based on the arrival times T3 and T6. For example, the equations (2)-(4) may be used to determine the distances between the UE 1005 and the stations 1010, 1012. The received timeline difference value (i.e., $\Delta_1 - \Delta_0$) may be used to modify the results of OTDOA measurements of the DL PRS transmissions 1002, 1004. For example, the UE 1005 may increase or decrease the value of T5 and/or T6 based on the timeline difference value 1006. In an embodiment, the time difference of arrival information may be provided to the network (e.g., LMF 120) to determine a location of the UE 200. In another example, the UE 200 may be configured to utilize the time difference of arrival information, the timeline difference value, and other assistance data (e.g., locations of the transmitting stations) to determine a location and report the location to the network.

The terms device and station as used herein may include either a base station or a user equipment. In example, functions of the devices in the method 1400 may be performed by a UE. For example, UL PRS and device-to-device sidelinks (e.g., PC5) may be used to provide PRS or other reference signals such as SRS for positioning. Other interfaces, such as the Uu interface, may be used to transmit one or more PRS.

Figure 15:
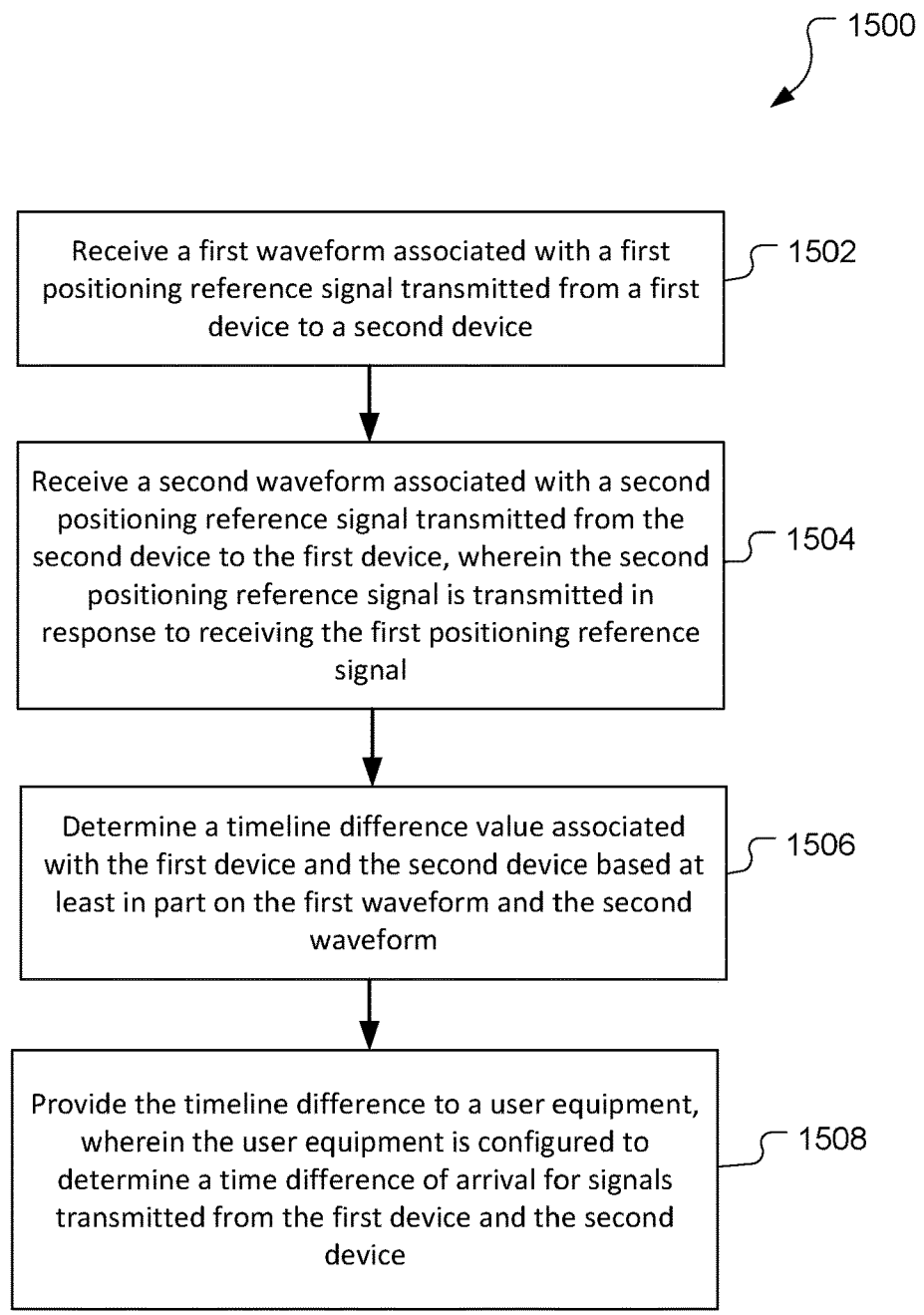
FIG. 15 is a process flow of an example method for determining a timeline difference value based on received waveforms.

Referring to FIG. 15, with further reference to FIGS. 1-12, a method 1500 for determining a timeline difference value based on received waveforms includes the stages shown. The method 1500 is, however, an example and not limiting. The method 1500 may be altered, e.g., by having stages added, removed, rearranged, combined, performed concurrently, and/or having single stages split into multiple stages.

At stage 1502, the method includes receiving a first waveform associated with a first positioning reference signal transmitted from a first device to a second device. A server 400 is a means for receiving the first waveform. In an example, the LMF 120, including the transceiver 415 and the processor 410, may be configured to receive the first waveform. The first waveform may be the CFRs of the subcarriers sounded by the first device, such as the first DL PRS 1002. Other quantized values of the frequency response may also be provided to the LMF 120 as a waveform associated with the first PRS.

At stage 1504, the method includes receiving a second waveform associated with a second positioning reference signal transmitted from the second device to the first device, wherein the second positioning reference signal is transmitted in response to receiving the first positioning reference signal. A server 400, including the transceiver 415 and the processor 410, is a means for receiving the second waveform. In an example, the LMF 120 may be configured to receive the second waveform. The second waveform may be the CFRs of the subcarriers sounded by the second device, such as the second DL PRS 1004. Other quantized values of the frequency response may also be provided to the LMF 120 as a waveform associated with the second PRS.

At stage 1506, the method includes determining a timeline difference value associated with the first device and the second device based at least in part on the first waveform and the second waveform. A server 400, including the processor 410, is a means for determining the timeline difference value. The LMF 120 may be configured to determine the timeline difference value. In an example, the timeline difference value is a timing offset value E, which can be estimated as the Maximum Likelihood Estimation (MLE) in the frequency domain by solving the delay required to compensate the phase rotation between the reciprocal CFRs (i.e., the first and second waveforms). For example, letting $H_{1,2}[k]$ and $H_{2,1}[k]$ be the CFRs of k-th subcarrier sounded by first device and the second device respectively in reciprocal directions, then:

$$f(\delta) = \left| \sum_{k=-\frac{N}{2}}^{k=\frac{N}{2}-1} H_{1,2}[k] H_{2,1}^*[k] \exp(-j2\pi k \Delta f \delta) \right| \quad (8)$$

$$\epsilon = \frac{1}{2} \times \arg\max_{\delta \in [-\bar{t}, \bar{t}]} f(\delta), \quad (9)$$

where $[-\bar{t}, \bar{t}]$ is the search window of the delay

Iterative Solution for $\epsilon$:

$$\epsilon_0 = 0, t_0 = \bar{t} \quad (10)$$

$$\epsilon_{n+1} = \frac{1}{2} \times \arg\max_{\delta \in [\epsilon_n - t_n, \epsilon_n + t_n]} f(\delta), t_{n+1} = \alpha t_n, \alpha \in (0, 1) \quad (11)$$

(default = 0.1, configurable)

$n = 0, \cdots, N_{max}$

At stage 1508, the method includes providing the timeline difference to a user equipment, wherein the user equipment is configured to determine a time difference of arrival for signals transmitted from the first device and the second device. A server 400, including the transceiver 415 and the processor 410, is a means for providing the timeline difference value. In an example, the LMF 120 may be configured to provide the timeline difference value. A serving cell or other device (e.g., the stations 1010, 1012) may broadcast or unicast the timeline difference value to a UE 200. For example, the timing difference value may be broadcast or provided in network signaling (e.g., RRC, LPP, NRPP, MAC-CE, SIBs, etc.). The UE 200 may utilize the timing difference value on OTDOA measurements based on DL PRS received from the first and second stations 1010, 1012.

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations. For example, one or more functions, or one or more portions thereof, discussed above as occurring in the LMF 120 may be performed outside of the LMF 120 such as by the TRP 300.

As used herein, the singular forms "a," "an," and "the" include the plural forms as well, unless the context clearly indicates otherwise. For example, "a processor" may include one processor or multiple processors. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

As used herein, unless otherwise stated, a statement that a function or operation is "based on" an item or condition means that the function or operation is based on the stated item or condition and may be based on one or more items and/or conditions in addition to the stated item or condition.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure). Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations, and does not limit the scope, applicability, or configurations of the claims. Rather, the preceding description of the configurations provides a description for implementing described techniques. Various changes may be made in the function and arrangement of elements without departing from the scope of the disclosure.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

Implementation examples are described in the following numbered clauses:

1. A method for providing a timeline difference value to a user equipment, comprising:
    transmitting a first positioning reference signal to a device;
    determining an arrival time for the first positioning reference signal based on a first timeline;
    receiving a second positioning reference signal from the device;

determining an arrival time for the second positioning reference signal based on a second timeline;
determining the timeline difference value based at least in part on the arrival times of the first positioning reference signal and the second positioning reference signal; and
providing the timeline difference value to the user equipment.

2. The method of clause 1 wherein the first positioning reference signal is transmitted with a first panel, the second positioning reference signal is received with the first panel, and the timeline difference value is associated with the first panel.

3. The method of clause 1 wherein the first positioning reference signal and the second positioning reference signal are not received via a line of sight transmission path.

4. The method of clause 1 wherein the providing the timeline difference value to the user equipment includes providing the timeline difference value to a network server.

5. The method of clause 1 wherein the providing the timeline difference value to the user equipment includes providing the timeline difference value via network signaling.

6. The method of clause 1 wherein determining the timeline difference value includes receiving the timeline difference value from a network server.

7. The method of clause 1 wherein the providing the timeline difference value to the user equipment includes providing identification information associated with two devices.

8. The method of clause 1 wherein the providing the timeline difference value to the user equipment includes providing identification information associated with the first positioning reference signal and the second positioning reference signal.

9. The method of clause 1 wherein the device is a second user equipment and the second positioning reference signal is received via a sidelink transmitted from the second user equipment.

10. The method of clause 1 further comprising providing assistance data to the user equipment.

11. The method of clause 1 wherein the first positioning reference signal and the second positioning reference signal are from different frequency layers.

12. A method for passive positioning of a user equipment, comprising:
receiving a first positioning reference signal from a first device at a first time;
receiving a second positioning reference signal from a second device at a second time;
receiving a timeline difference value associated with the first device and the second device; and
determining a time difference of arrival between the first positioning reference signal and the second positioning reference signal based at least in part on the timeline difference value.

13. The method of clause 12 wherein the timeline difference value is received from a serving device.

14. The method of clause 12 wherein the first positioning reference signal is an on-demand positioning reference signal.

15. The method of clause 12 further comprising receiving a passive positioning start message prior to receiving the first positioning reference signal.

16. The method of clause 12 further comprising providing the time difference of arrival to a network server.

17. The method of clause 12 wherein the first positioning reference signal is associated with a first panel in the first device and the timeline difference value is associated with the first panel.

18. The method of clause 12 wherein the second device is a second user equipment and the second positioning reference signal is received via a sidelink transmitted from the second user equipment.

19. The method of clause 12 further comprising:
receiving a third positioning reference signal from a third device;
receiving a second timeline difference value associated with the second device and the third device; and
determining a second time difference of arrival between the second positioning reference signal and the third positioning reference signal based at least in part on the second timeline difference value.

20. The method of clause 19 further comprising:
receiving a third timeline difference value associated with the first device and the third device; and
determining a third time difference of arrival between the first positioning reference signal and the third positioning reference signal based at least in part on the third timeline difference value.

21. The method of clause 19 further comprising:
determining a third timeline difference value associated with the first device and the third device based at least in part on the timeline difference value and the second timeline difference value; and
determining a third time difference of arrival between the first positioning reference signal and the third positioning reference signal based at least in part on the third timeline difference value.

22. The method of clause 12 further comprising calculating a position estimate based at least in part on the time difference of arrival.

23. A method for determining a timeline difference value, comprising:
receiving a first waveform associated with a first positioning reference signal transmitted from a first device to a second device;
receiving a second waveform associated with a second positioning reference signal transmitted from the second device to the first device, wherein the second positioning reference signal is transmitted in response to receiving the first positioning reference signal;
determining the timeline difference value associated with the first device and the second device based at least on part on the first waveform and the second waveform; and
providing the timeline difference value to a user equipment, wherein the user equipment is configured to determine a time difference of arrival for signals transmitted from the first device and the second device.

24. The method of clause 23 wherein the first waveform is a first channel frequency response of the first positioning reference signal and the second waveform is a second channel frequency response of the second positioning reference signal.

25. The method of clause 24 wherein the timeline difference value is estimated via a maximum likelihood estimation in a frequency domain based on a delay required to compensate a phase rotation between the first channel frequency response and the second channel frequency response.

26. The method of clause 23 wherein providing the timeline difference value to the user equipment includes providing the timeline difference value to a serving device.

27. The method of clause 23 wherein providing the timeline difference value to the user equipment includes providing the timeline difference value to the first device or the second device.

28. An apparatus for providing a timeline difference value to a user equipment, comprising:
a memory;
at least one transceiver;
at least one processor communicatively coupled to the memory and the at least one transceiver, and configured to:
transmit a first positioning reference signal to a device;
determine an arrival time for the first positioning reference signal based on a first timeline;
receive a second positioning reference signal from the device;
determine an arrival time for the second positioning reference signal based on a second timeline;
determine the timeline difference value based at least in part on the arrival times of the first positioning reference signal and the second positioning reference signal; and
provide the timeline difference value to the user equipment.

29. The apparatus of clause 28 further comprising a first panel communicatively coupled to the at least one transceiver, wherein the first positioning reference signal is transmitted with the first panel, the second positioning reference signal is received with the first panel, and the timeline difference value is associated with the first panel.

30. The apparatus of clause 28 wherein the first positioning reference signal and the second positioning reference signal are not received via a line of sight transmission path.

31. The apparatus of clause 28 wherein the at least one processor is further configured to provide the timeline difference value to a network server.

32. The apparatus of clause 28 wherein the at least one processor is further configured to provide the timeline difference value via network signaling.

33. The apparatus of clause 28 wherein the at least one processor is further configured to receive the timeline difference value from a network server.

34. The apparatus of clause 28 wherein the at least one processor is further configured to provide identification information associated with two devices.

35. The apparatus of clause 28 wherein the at least one processor is further configured to provide identification information associated with the first positioning reference signal and the second positioning reference signal.

36. The apparatus of clause 28 wherein the device is a second user equipment and the second positioning reference signal is received via a sidelink transmitted from the second user equipment.

37. The apparatus of clause 28 wherein the at least one processor is further configured to provide assistance data to the user equipment.

38. The apparatus of clause 28 wherein the first positioning reference signal and the second positioning reference signal are from different frequency layers.

39. An apparatus, comprising:
a memory;
at least one transceiver;
at least one processor communicatively coupled to the memory and the at least one transceiver and configured to:
receive a first positioning reference signal from a first device at a first time;
receive a second positioning reference signal from a second device at a second time;
receive a timeline difference value associated with the first device and the second device; and
determine a time difference of arrival between the first positioning reference signal and the second positioning reference signal based at least in part on the timeline difference value.

40. The apparatus of clause 39 wherein the at least one processor is further configured to receive the timeline difference value from a serving device.

41. The apparatus of clause 39 wherein the first positioning reference signal is an on-demand positioning reference signal.

42. The apparatus of clause 39 wherein the at least one processor is further configured to receive a passive positioning start message prior to receiving the first positioning reference signal.

43. The apparatus of clause 39 wherein the at least one processor is further configured to provide the time difference of arrival to a network server.

44. The apparatus of clause 39 further comprising a first panel operably coupled to the at least one transceiver, wherein the first positioning reference signal is associated with the first panel in the first device and the timeline difference value is associated with the first panel.

45. The apparatus of clause 39 wherein the second device is a second user equipment and the second positioning reference signal is received via a sidelink transmitted from the second user equipment.

46. The apparatus of clause 39 wherein the at least one processor is further configured to:
receive a third positioning reference signal from a third device;
receive a second timeline difference value associated with the second device and the third device; and
determine a second time difference of arrival between the second positioning reference signal and the third positioning reference signal based at least in part on the second timeline difference value.

47. The apparatus of clause 46 wherein the at least one processor is further configured to:
receive a third timeline difference value associated with the first device and the third device; and
determine a third time difference of arrival between the first positioning reference signal and the third positioning reference signal based at least in part on the third timeline difference value.

48. The apparatus of clause 46 wherein the at least one processor is further configured to:
determine a third timeline difference value associated with the first device and the third device based at least in part on the timeline difference value and the second timeline difference value; and
determine a third time difference of arrival between the first positioning reference signal and the third positioning reference signal based at least in part on the third timeline difference value.

49. The apparatus of clause 39 wherein the at least one processor is further configured to calculate a position estimate based at least in part on the time difference of arrival.
50. An apparatus, comprising:
a memory;
at least one transceiver;
at least one processor communicatively coupled to the memory and the at least one transceiver and configured to:
receive a first waveform associated with a first positioning reference signal transmitted from a first device to a second device;
receive a second waveform associated with a second positioning reference signal transmitted from the second device to the first device, wherein the second positioning reference signal is transmitted in response to receiving the first positioning reference signal;
determine a timeline difference value associated with the first device and the second device based at least on part on the first waveform and the second waveform; and
provide the timeline difference value to a user equipment, wherein the user equipment is configured to determine a time difference of arrival for signals transmitted from the first device and the second device.
51. The apparatus of clause 50 wherein the first waveform is a first channel frequency response of the first positioning reference signal and the second waveform is a second channel frequency response of the second positioning reference signal.
52. The apparatus of clause 51 wherein the timeline difference value is an estimated via a maximum likelihood estimation in a frequency domain based on a delay required to compensate a phase rotation between the first channel frequency response and the second channel frequency response.
53. The apparatus of clause 50 wherein the at least one processor is further configured to provide the timeline difference value to a serving device.
54. The apparatus of clause 50 wherein the at least one processor is further configured to provide the timeline difference value to the first device or the second device.
55. An apparatus, comprising:
means for transmitting a first positioning reference signal to a device;
means for determining an arrival time for the first positioning reference signal based on a first timeline;
means for receiving a second positioning reference signal from the device;
means for determining an arrival time for the second positioning reference signal based on a second timeline;
means for determining a timeline difference value based at least in part on the arrival times of the first positioning reference signal and the second positioning reference signal; and
means for providing the timeline difference value to a user equipment.
56. An apparatus, comprising:
means for receiving a first positioning reference signal from a first device at a first time;
means for receiving a second positioning reference signal from a second device at a second time;
means for receiving a timeline difference value associated with the first device and the second device; and
means for determining a time difference of arrival between the first positioning reference signal and the second positioning reference signal based at least in part on the timeline difference value.
57. An apparatus, comprising:
means for receiving a first waveform associated with a first positioning reference signal transmitted from a first device to a second device;
means for receiving a second waveform associated with a second positioning reference signal transmitted from the second device to the first device, wherein the second positioning reference signal is transmitted in response to receiving the first positioning reference signal;
means for determining a timeline difference value associated with the first device and the second device based at least on part on the first waveform and the second waveform; and
means for providing the timeline difference value to a user equipment, wherein the user equipment is configured to determine a time difference of arrival for signals transmitted from the first device and the second device.
58. A non-transitory processor-readable storage medium comprising processor-readable instructions configured to cause one or more processors to provide a timeline difference value to a user equipment, comprising:
code for transmitting a first positioning reference signal to a device;
code for determining an arrival time for the first positioning reference signal based on a first timeline;
code for receiving a second positioning reference signal from the device;
code for determining an arrival time for the second positioning reference signal based on a second timeline;
code for determining the timeline difference value based at least in part on the arrival times of the first positioning reference signal and the second positioning reference signal; and
code for providing the timeline difference value to the user equipment.
59. A non-transitory processor-readable storage medium comprising processor-readable instructions configured to cause one or more processors to position a user equipment, comprising:
code for receiving a first positioning reference signal from a first device at a first time;
code for receiving a second positioning reference signal from a second device at a second time;
code for receiving a timeline difference value associated with the first device and the second device; and
code for determining a time difference of arrival between the first positioning reference signal and the second positioning reference signal based at least in part on the timeline difference value.
60. A non-transitory processor-readable storage medium comprising processor-readable instructions configured to cause one or more processors to determine a timeline difference value, comprising:
code for receiving a first waveform associated with a first positioning reference signal transmitted from a first device to a second device;
code for receiving a second waveform associated with a second positioning reference signal transmitted from the second device to the first device, wherein the second positioning reference signal is transmitted in response to receiving the first positioning reference signal;

code for determining the timeline difference value associated with the first device and the second device based at least on part on the first waveform and the second waveform; and code for providing the timeline difference value to a user equipment, wherein the user equipment is configured to determine a time difference of arrival for signals transmitted from the first device and the second device.

The invention claimed is:

1. A method for providing a timeline difference value to a user equipment, comprising:
   transmitting a first positioning reference signal to a device with a first panel;
   determining an arrival time for the first positioning reference signal based on a first timeline;
   receiving a second positioning reference signal from the device with the first panel;
   determining an arrival time for the second positioning reference signal based on a second timeline;
   determining the timeline difference value associated with the first panel based at least in part on the arrival times of the first positioning reference signal and the second positioning reference signal; and
   providing the timeline difference value to the user equipment.

2. The method of claim 1 wherein the first positioning reference signal and the second positioning reference signal are not received via a line of sight transmission path.

3. The method of claim 1 wherein the providing the timeline difference value to the user equipment includes providing the timeline difference value to a network server.

4. The method of claim 1 wherein the providing the timeline difference value to the user equipment includes providing the timeline difference value via network signaling.

5. The method of claim 1 wherein determining the timeline difference value includes receiving the timeline difference value from a network server.

6. The method of claim 1 wherein the providing the timeline difference value to the user equipment includes providing identification information associated with two devices.

7. The method of claim 1 wherein the providing the timeline difference value to the user equipment includes providing identification information associated with the first positioning reference signal and the second positioning reference signal.

8. The method of claim 1 wherein the device is a second user equipment and the second positioning reference signal is received via a sidelink transmitted from the second user equipment.

9. The method of claim 1 further comprising providing assistance data to the user equipment.

10. The method of claim 1 wherein the first positioning reference signal and the second positioning reference signal are from different frequency layers.

11. A method for passive positioning of a user equipment, comprising:
    receiving a first positioning reference signal from a first panel of a first device at a first time;
    receiving a second positioning reference signal from a second device at a second time;
    receiving a timeline difference value associated with the first panel of the first device and the second device; and
    determining a time difference of arrival between the first positioning reference signal and the second positioning reference signal based at least in part on the timeline difference value.

12. The method of claim 11 wherein the timeline difference value is received from a serving device.

13. The method of claim 11 wherein the first positioning reference signal is an on-demand positioning reference signal.

14. The method of claim 11 further comprising receiving a passive positioning start message prior to receiving the first positioning reference signal.

15. The method of claim 11 further comprising providing the time difference of arrival to a network server.

16. The method of claim 11 wherein the second device is a second user equipment and the second positioning reference signal is received via a sidelink transmitted from the second user equipment.

17. The method of claim 11 further comprising:
    receiving a third positioning reference signal from a third device;
    receiving a second timeline difference value associated with the second device and the third device; and
    determining a second time difference of arrival between the second positioning reference signal and the third positioning reference signal based at least in part on the second timeline difference value.

18. The method of claim 17 further comprising:
    receiving a third timeline difference value associated with the first panel of the first device and the third device; and
    determining a third time difference of arrival between the first positioning reference signal and the third positioning reference signal based at least in part on the third timeline difference value.

19. The method of claim 17 further comprising:
    determining a third timeline difference value associated with the first panel of the first device and the third device based at least in part on the timeline difference value and the second timeline difference value; and
    determining a third time difference of arrival between the first positioning reference signal and the third positioning reference signal based at least in part on the third timeline difference value.

20. The method of claim 11 further comprising calculating a position estimate based at least in part on the time difference of arrival.

21. A method for determining a timeline difference value, comprising:
    receiving a first waveform associated with a first positioning reference signal transmitted from a first device to a second device;
    receiving a second waveform associated with a second positioning reference signal transmitted from the second device to the first device, wherein the second positioning reference signal is transmitted in response to receiving the first positioning reference signal;
    determining the timeline difference value associated with the first device and the second device based at least on part on the first waveform and the second waveform; and
    providing the timeline difference value to a user equipment, wherein the user equipment is configured to determine a time difference of arrival for signals transmitted from the first device and the second device.

22. The method of claim 21 wherein the first waveform is a first channel frequency response of the first positioning reference signal and the second waveform is a second channel frequency response of the second positioning reference signal.

23. The method of claim 22 wherein the timeline difference value is estimated via a maximum likelihood estimation in a frequency domain based on a delay required to compensate a phase rotation between the first channel frequency response and the second channel frequency response.

24. The method of claim 21 wherein providing the timeline difference value to the user equipment includes providing the timeline difference value to a serving device.

25. The method of claim 21 wherein providing the timeline difference value to the user equipment includes providing the timeline difference value to the first device or the second device.

26. An apparatus for providing a timeline difference value to a user equipment, comprising:
a memory;
at least one transceiver communicatively coupled to a first antenna panel;
at least one processor communicatively coupled to the memory and the at least one transceiver, and configured to:
transmit a first positioning reference signal to a device with the first antenna panel;
determine an arrival time for the first positioning reference signal based on a first timeline;
receive a second positioning reference signal from the device;
determine an arrival time for the second positioning reference signal based on a second timeline;
determine the timeline difference value associated with the first antenna panel based at least in part on the arrival times of the first positioning reference signal and the second positioning reference signal; and
provide the timeline difference value to the user equipment.

27. The apparatus of claim 26 wherein the first positioning reference signal and the second positioning reference signal are not received via a line of sight transmission path.

28. The apparatus of claim 26 wherein the at least one processor is further configured to provide the timeline difference value to a network server.

29. The apparatus of claim 26 wherein the at least one processor is further configured to provide the timeline difference value via network signaling.

30. The apparatus of claim 26 wherein the at least one processor is further configured to receive the timeline difference value from a network server.

31. The apparatus of claim 26 wherein the at least one processor is further configured to provide identification information associated with two devices.

32. The apparatus of claim 26 wherein the at least one processor is further configured to provide identification information associated with the first positioning reference signal and the second positioning reference signal.

33. The apparatus of claim 26 wherein the device is a second user equipment and the second positioning reference signal is received via a sidelink transmitted from the second user equipment.

34. The apparatus of claim 26 wherein the at least one processor is further configured to provide assistance data to the user equipment.

35. The apparatus of claim 26 wherein the first positioning reference signal and the second positioning reference signal are from different frequency layers.

36. An apparatus, comprising:
a memory;
at least one transceiver;
at least one processor communicatively coupled to the memory and the at least one transceiver and configured to:
receive a first positioning reference signal from a first panel of a first device at a first time;
receive a second positioning reference signal from a second device at a second time;
receive a timeline difference value associated with the first panel of the first device and the second device; and
determine a time difference of arrival between the first positioning reference signal and the second positioning reference signal based at least in part on the timeline difference value.

37. The apparatus of claim 36 wherein the at least one processor is further configured to receive the timeline difference value from a serving device.

38. The apparatus of claim 36 wherein the first positioning reference signal is an on-demand positioning reference signal.

39. The apparatus of claim 36 wherein the at least one processor is further configured to receive a passive positioning start message prior to receiving the first positioning reference signal.

40. The apparatus of claim 36 wherein the at least one processor is further configured to provide the time difference of arrival to a network server.

41. The apparatus of claim 36 wherein the second device is a second user equipment and the second positioning reference signal is received via a sidelink transmitted from the second user equipment.

42. The apparatus of claim 36 wherein the at least one processor is further configured to:
receive a third positioning reference signal from a third device;
receive a second timeline difference value associated with the second device and the third device; and
determine a second time difference of arrival between the second positioning reference signal and the third positioning reference signal based at least in part on the second timeline difference value.

43. The apparatus of claim 42 wherein the at least one processor is further configured to:
receive a third timeline difference value associated with the first panel the first device and the third device; and
determine a third time difference of arrival between the first positioning reference signal and the third positioning reference signal based at least in part on the third timeline difference value.

44. The apparatus of claim 42 wherein the at least one processor is further configured to:
determine a third timeline difference value associated with the first panel of the first device and the third device based at least in part on the timeline difference value and the second timeline difference value; and
determine a third time difference of arrival between the first positioning reference signal and the third positioning reference signal based at least in part on the third timeline difference value.

45. The apparatus of claim 36 wherein the at least one processor is further configured to calculate a position estimate based at least in part on the time difference of arrival.

46. An apparatus, comprising:
a memory;
at least one transceiver;
at least one processor communicatively coupled to the memory and the at least one transceiver and configured to:
  receive a first waveform associated with a first positioning reference signal transmitted from a first device to a second device;
  receive a second waveform associated with a second positioning reference signal transmitted from the second device to the first device, wherein the second positioning reference signal is transmitted in response to receiving the first positioning reference signal;
  determine a timeline difference value associated with the first device and the second device based at least on part on the first waveform and the second waveform; and
  provide the timeline difference value to a user equipment, wherein the user equipment is configured to determine a time difference of arrival for signals transmitted from the first device and the second device.

47. The apparatus of claim 46 wherein the first waveform is a first channel frequency response of the first positioning reference signal and the second waveform is a second channel frequency response of the second positioning reference signal.

48. The apparatus of claim 47 wherein the timeline difference value is an estimated via a maximum likelihood estimation in a frequency domain based on a delay required to compensate a phase rotation between the first channel frequency response and the second channel frequency response.

49. The apparatus of claim 46 wherein the at least one processor is further configured to provide the timeline difference value to a serving device.

50. The apparatus of claim 46 wherein the at least one processor is further configured to provide the timeline difference value to the first device or the second device.

51. An apparatus, comprising:
  means for transmitting a first positioning reference signal to a device with a first panel;
  means for determining an arrival time for the first positioning reference signal based on a first timeline;
  means for receiving a second positioning reference signal from the device the first panel;
  means for determining an arrival time for the second positioning reference signal based on a second timeline;
  means for determining a timeline difference value associated with the first panel based at least in part on the arrival times of the first positioning reference signal and the second positioning reference signal; and
  means for providing the timeline difference value to a user equipment.

52. An apparatus, comprising:
  means for receiving a first positioning reference signal from a first panel of a first device at a first time;
  means for receiving a second positioning reference signal from a second device at a second time;
  means for receiving a timeline difference value associated with the first panel of the first device and the second device; and
  means for determining a time difference of arrival between the first positioning reference signal and the second positioning reference signal based at least in part on the timeline difference value.

53. An apparatus, comprising:
  means for receiving a first waveform associated with a first positioning reference signal transmitted from a first device to a second device;
  means for receiving a second waveform associated with a second positioning reference signal transmitted from the second device to the first device, wherein the second positioning reference signal is transmitted in response to receiving the first positioning reference signal;
  means for determining a timeline difference value associated with the first device and the second device based at least on part on the first waveform and the second waveform; and
  means for providing the timeline difference value to a user equipment, wherein the user equipment is configured to determine a time difference of arrival for signals transmitted from the first device and the second device.

54. A non-transitory processor-readable storage medium comprising processor-readable instructions configured to cause one or more processors to provide a timeline difference value to a user equipment, comprising:
  code for transmitting a first positioning reference signal to a device with a first panel;
  code for determining an arrival time for the first positioning reference signal based on a first timeline;
  code for receiving a second positioning reference signal from the device with the first panel;
  code for determining an arrival time for the second positioning reference signal based on a second timeline;
  code for determining the timeline difference value associated with the first panel based at least in part on the arrival times of the first positioning reference signal and the second positioning reference signal; and
  code for providing the timeline difference value to the user equipment.

55. A non-transitory processor-readable storage medium comprising processor-readable instructions configured to cause one or more processors to position a user equipment, comprising:
  code for receiving a first positioning reference signal from a first panel of a first device at a first time;
  code for receiving a second positioning reference signal from a second device at a second time;
  code for receiving a timeline difference value associated with the first panel of the first device and the second device; and
  code for determining a time difference of arrival between the first positioning reference signal and the second positioning reference signal based at least in part on the timeline difference value.

56. A non-transitory processor-readable storage medium comprising processor-readable instructions configured to cause one or more processors to determine a timeline difference value, comprising:
  code for receiving a first waveform associated with a first positioning reference signal transmitted from a first device to a second device;
  code for receiving a second waveform associated with a second positioning reference signal transmitted from the second device to the first device, wherein the second positioning reference signal is transmitted in response to receiving the first positioning reference signal;

code for determining the timeline difference value associated with the first device and the second device based at least on part on the first waveform and the second waveform; and code for providing the timeline difference value to a user equipment, wherein the user equipment is configured to determine a time difference of arrival for signals transmitted from the first device and the second device.

\* \* \* \* \*